(12) United States Patent
Shimada

(10) Patent No.: US 7,508,759 B2
(45) Date of Patent: Mar. 24, 2009

(54) NETWORK SIDE TRANSMISSION APPARATUS AND METHOD FOR CONTROLLING VARIABLE TRAFFIC RATE BY DYNAMIC BANDWIDTH ALLOCATION

(75) Inventor: Nagao Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1134 days.

(21) Appl. No.: 10/197,366

(22) Filed: Jul. 17, 2002

(65) Prior Publication Data
US 2003/0142692 A1 Jul. 31, 2003

(30) Foreign Application Priority Data
Jan. 31, 2002 (JP) ............... 2002-024424

(51) Int. Cl.
*H04J 3/16* (2006.01)
*H04J 3/14* (2006.01)

(52) U.S. Cl. ................. 370/232; 370/468; 370/477

(58) Field of Classification Search ...... 370/229–236.2, 370/395.4–395.41, 449, 468
See application file for complete search history.

(56) References Cited

U.S. PATENT DOCUMENTS

| 6,072,773 | A | * | 6/2000 | Fichou et al. | ............... 370/230 |
| 6,141,322 | A | * | 10/2000 | Poretsky | ..................... 370/231 |
| 6,285,657 | B1 | * | 9/2001 | Lewis et al. | ................... 370/230 |
| 6,442,138 | B1 | * | 8/2002 | Yin et al. | ..................... 370/232 |
| 6,690,678 | B1 | * | 2/2004 | Basso et al. | ................. 370/468 |
| 6,731,605 | B1 | * | 5/2004 | Deshpande | ................. 370/252 |
| 6,757,251 | B1 | * | 6/2004 | Nakaishi | ................... 370/236.2 |
| 2001/0028633 | A1 | | 10/2001 | Shimada et al. | |

FOREIGN PATENT DOCUMENTS

| EP | 1 021 058 | 7/2000 |
| JP | 10-242981 | 9/1998 |
| WO | 97/35410 | 9/1997 |

OTHER PUBLICATIONS

Fratta, et al., "Congestion Control Strategies in ATM Networks (*)" European Transactions on Telecommunications and Related Technologies vol. 3, No. 2: Mar. 1, 1992, pp. 183-193 XP 000291693; ISSN: 1120-3862.

* cited by examiner

*Primary Examiner*—Wing F Chan
*Assistant Examiner*—Marcus R Smith
(74) *Attorney, Agent, or Firm*—Katten Muchin Rosenman LLP

(57) ABSTRACT

A communication system that includes a single subscriber line terminal on a network side, a number of terminal units on a user side, and a single transmission line shared thereby multiplexing through polling. In the communication system, a queue length extracting unit extracts from information stored for each connection, a parameter setting unit sets the contracted parameters of a sustainable cell rate and peak cell rate and contracted parameters of fluctuation values, a parameter managing memory stores the queue length information and the contracted parameter information, a bandwidth calculating unit re-stores results of periodic calculation of the cell rates so that the contracted parameters are observed, and a transfer polling information generating unit determines timings of transfer of information in accordance with the calculated allocated cell rates and outputting them.

7 Claims, 22 Drawing Sheets

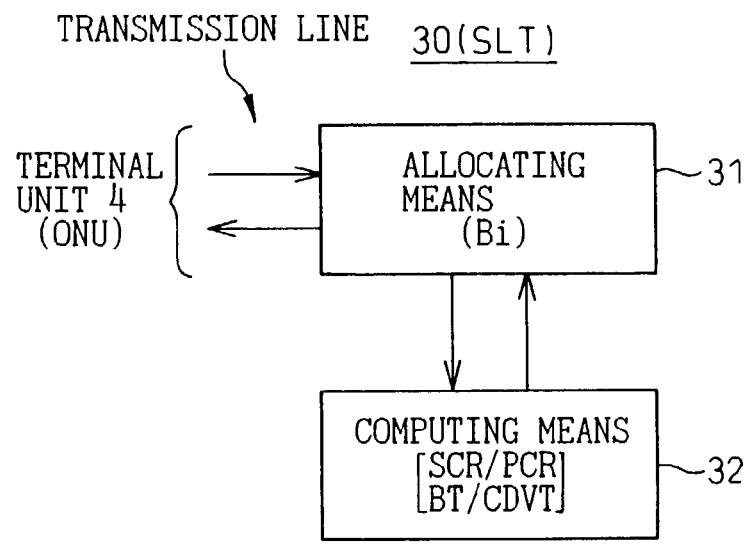
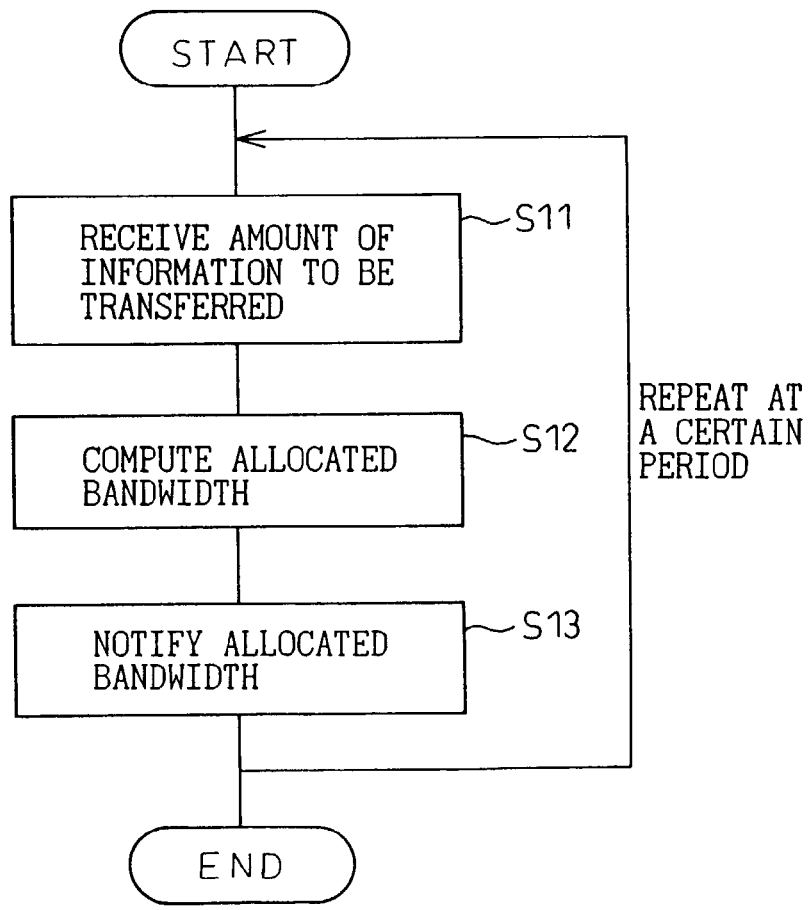

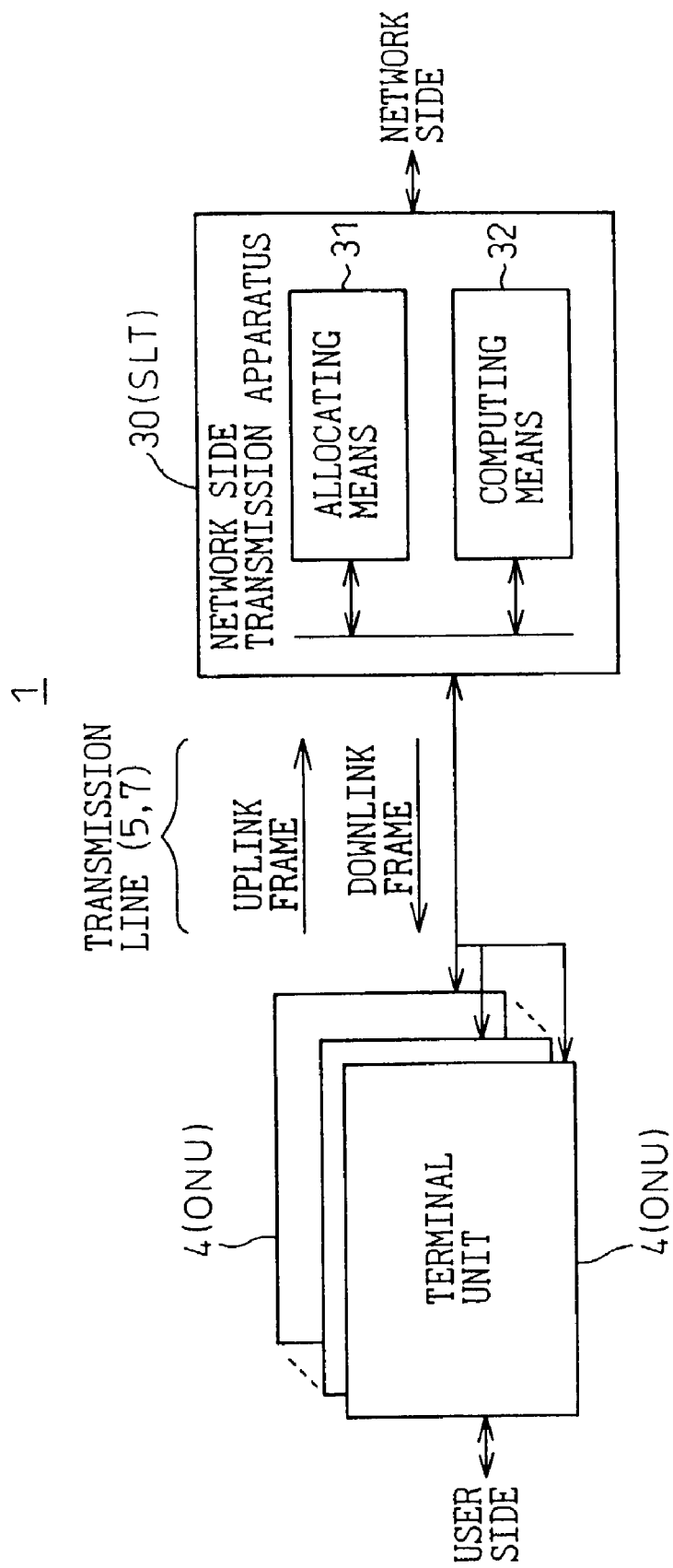

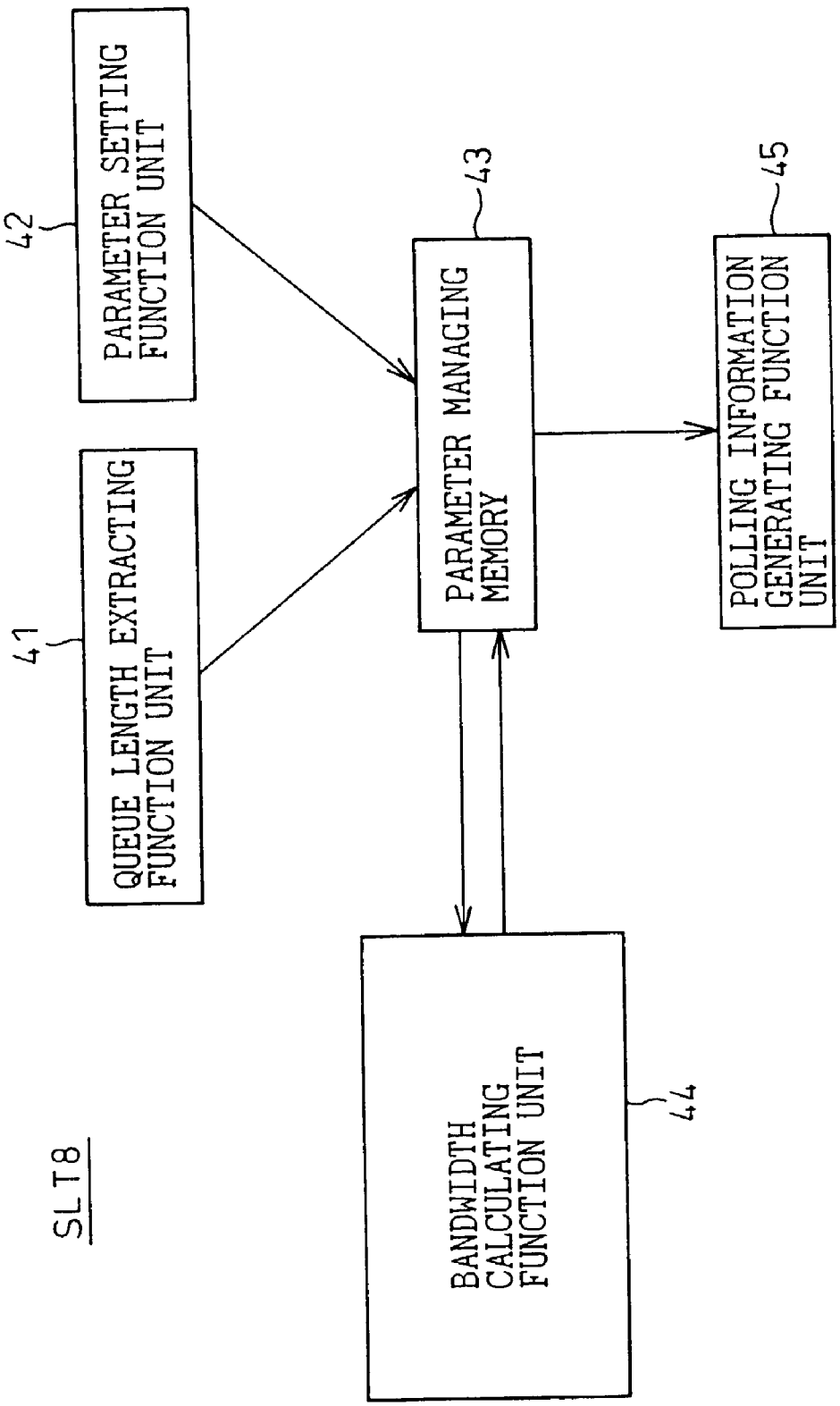

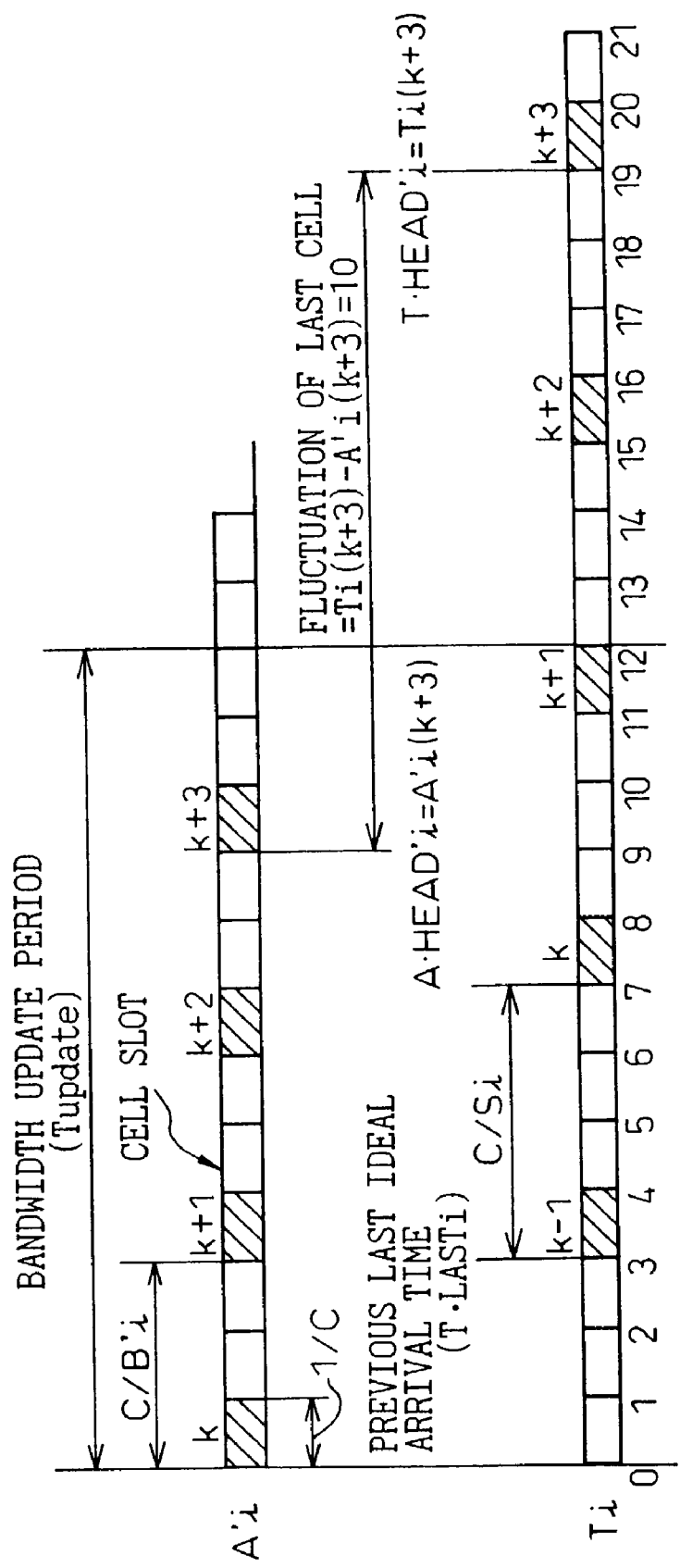

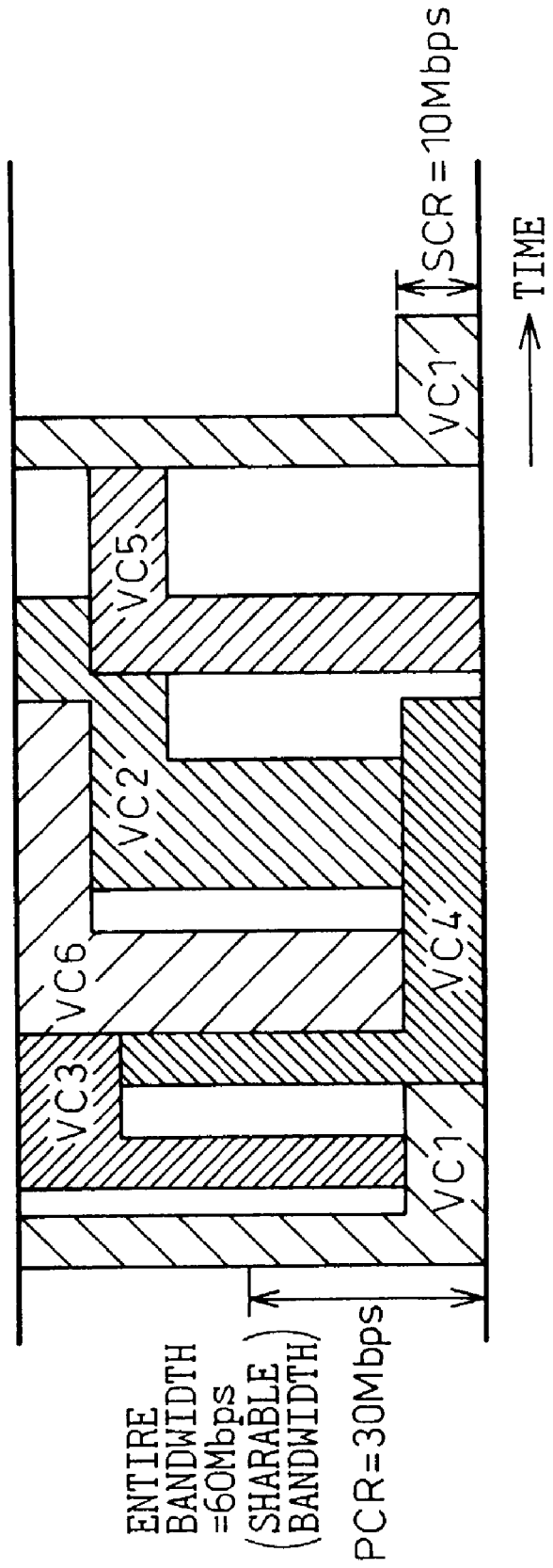

FIG.15

| HEAD 1 | 2 | 3 | 4 | 5 | 6 | 7 | 8 | 9 | ------- | N |
|---|---|---|---|---|---|---|---|---|---|---|
| 0x04 | 0x3d | 0x14 | 0x8e | 0x55 | 0xca | 0x42 | 0xc3 | 0xd3 | | 0xd3 |

POLLING INFORMATION

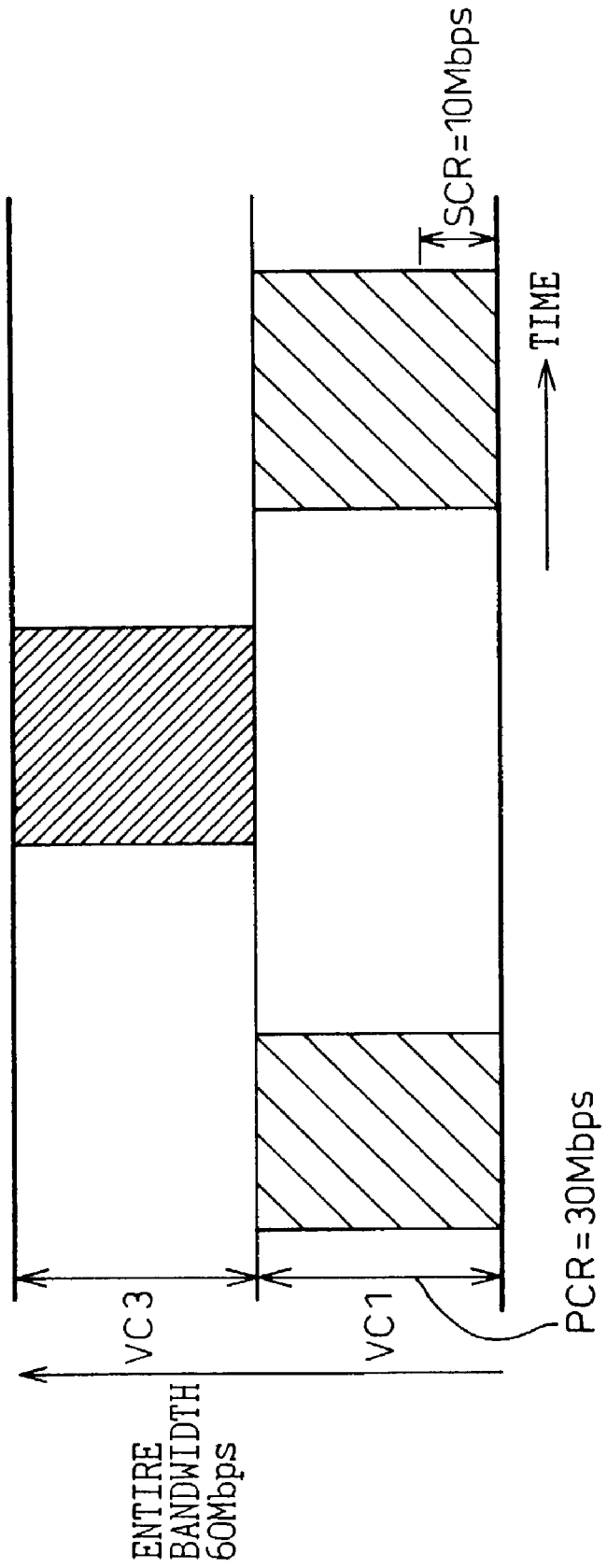

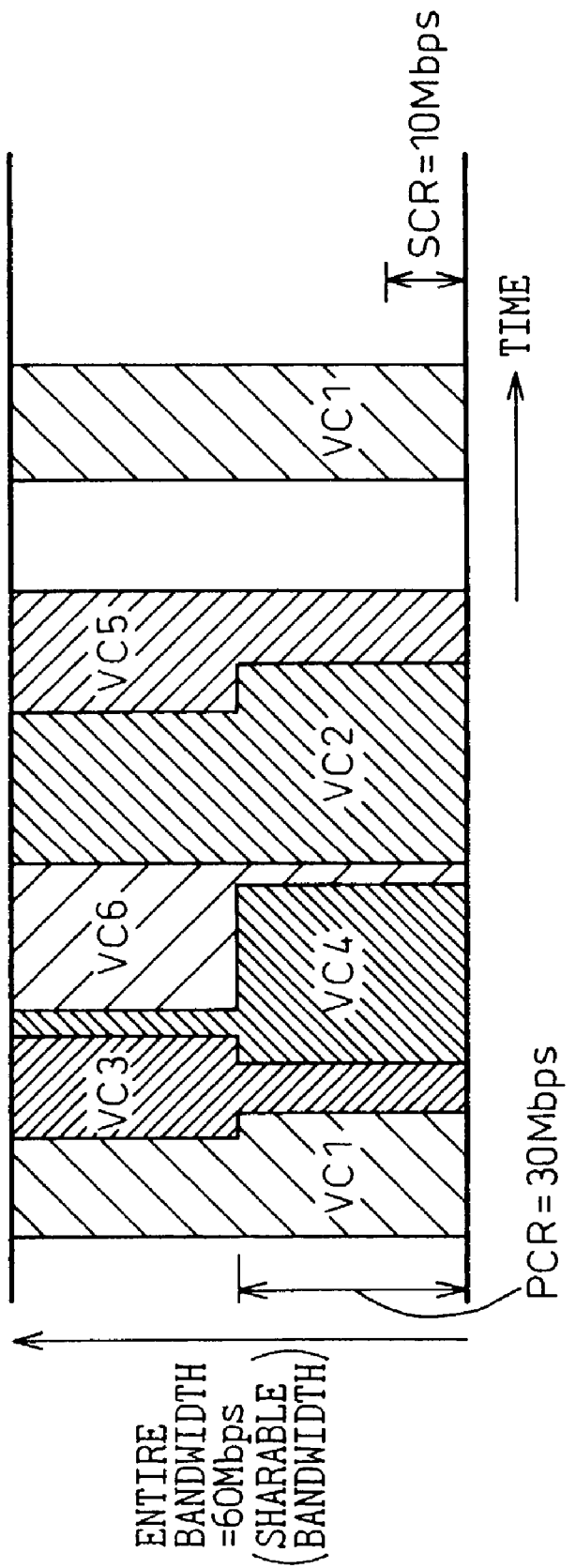

NETWORK SIDE TRANSMISSION APPARATUS AND METHOD FOR CONTROLLING VARIABLE TRAFFIC RATE BY DYNAMIC BANDWIDTH ALLOCATION

BACKGROUND OF THE INVENTION

1. Field of the Invention

The present invention relates to a communication system where a single subscriber line terminal (SLT) unit on a network side and a plurality of terminal units on a user side share a single transmission line and transfers information by time division multiplexing through polling.

As a typical example of such a type of communication system, there is an asynchronous transfer mode-passive optical network (ATM-PON) communication system. The present invention will be explained below with reference to the example of this ATM-PON communication system. In particular, the present invention provides an improved technique for dynamic bandwidth allocation for handling variable rate traffic in such an ATM-PON communication system.

2. Description of the Related Art

As will be explained in detail later with reference to the drawings, in a conventional communication system handling variable rate traffic, no consideration at all is given to parameters such as the peak cell rate (PCR), sustainable cell rate (SCR), and burst tolerance (BT). Therefore, the problem arose of allocating large bandwidths continuously without limit to virtual connections (VC) in which large numbers of cells are accumulated in buffers of the terminal units on the user side. Therefore, the subscriber line terminal (SLT) unit at the network side could no longer make effective use of the communication resources as planned.

SUMMARY OF THE INVENTION

An object of the present invention is to provide a method and apparatus for dynamic bandwidth allocation designed to improve the efficiency of transfer of information in a communication system handling variable rate traffic and simultaneously ensure that the peak cell rate (PCR), sustainable cell rate (SCR), burst tolerance (BT), and other contracted parameters are observed by shaping the allocated bandwidths.

To attain the above object, the communication system according to the present invention is comprised of a queue length extracting function unit (41) extracting from information stored for each connection, a parameter setting function unit (42) for setting the contracted parameters of a sustainable cell rate (SCR) and peak cell rate (PCR) and contracted parameters of fluctuation values allowed in these bandwidths for each connection, a parameter managing memory (43) for storing the queue length information and the contracted parameter information, a bandwidth calculating function unit (44) for re-storing in the memory (43) results of periodic calculation of the cell rates allocated to connection so that the contracted parameters are observed, and a transfer polling information generating function unit (45) determining timings of transfer of information in accordance with the calculated allocated cell rates and outputting them as the polling information. Due to this, it is possible to improve the efficiency of allocation of bandwidth in a transmission line between a plurality of terminal units such as optical network units (ONU) and a subscriber line terminal (SLT) in an ATM-PON communication system while observing the contracted parameters.

BRIEF DESCRIPTION OF THE DRAWINGS

These and other objects and features of the present invention will become clearer from the following description of the preferred embodiments given with reference to the attached drawings, wherein:

FIG. 1 is a view of the basic configuration of a network side transmission apparatus according to the present invention;

FIG. 2 is a flow chart of a method of control of variable rate traffic according to the present invention;

FIG. 3 is a block diagram of a communication system according to the present invention;

FIG. 4 is a view of a specific example of the configuration of a subscriber line terminal (SLT) unit according to the present invention;

FIG. 5 is a timing chart illustrating the relationship between ideal arrival times and scheduled arrival times in a bandwidth updating period;

FIG. 6 is a view of an example of a model of bandwidth allocation according to a first embodiment;

FIG. 15 is a view of an example of the data format of polling information transferred by a downlink frame;

FIG. 22 is a view of an example of a model of bandwidth allocation under a fixed peak cell rate (PCR) allocation system; and FIG. 23 is a view of an example of a model of bandwidth allocation under a dynamic bandwidth allocation system.

DESCRIPTION OF THE PREFERRED EMBODIMENTS

Before describing the embodiments of the present invention, the related art and the disadvantages therein will be described with reference to the related figures.

Figure 12:
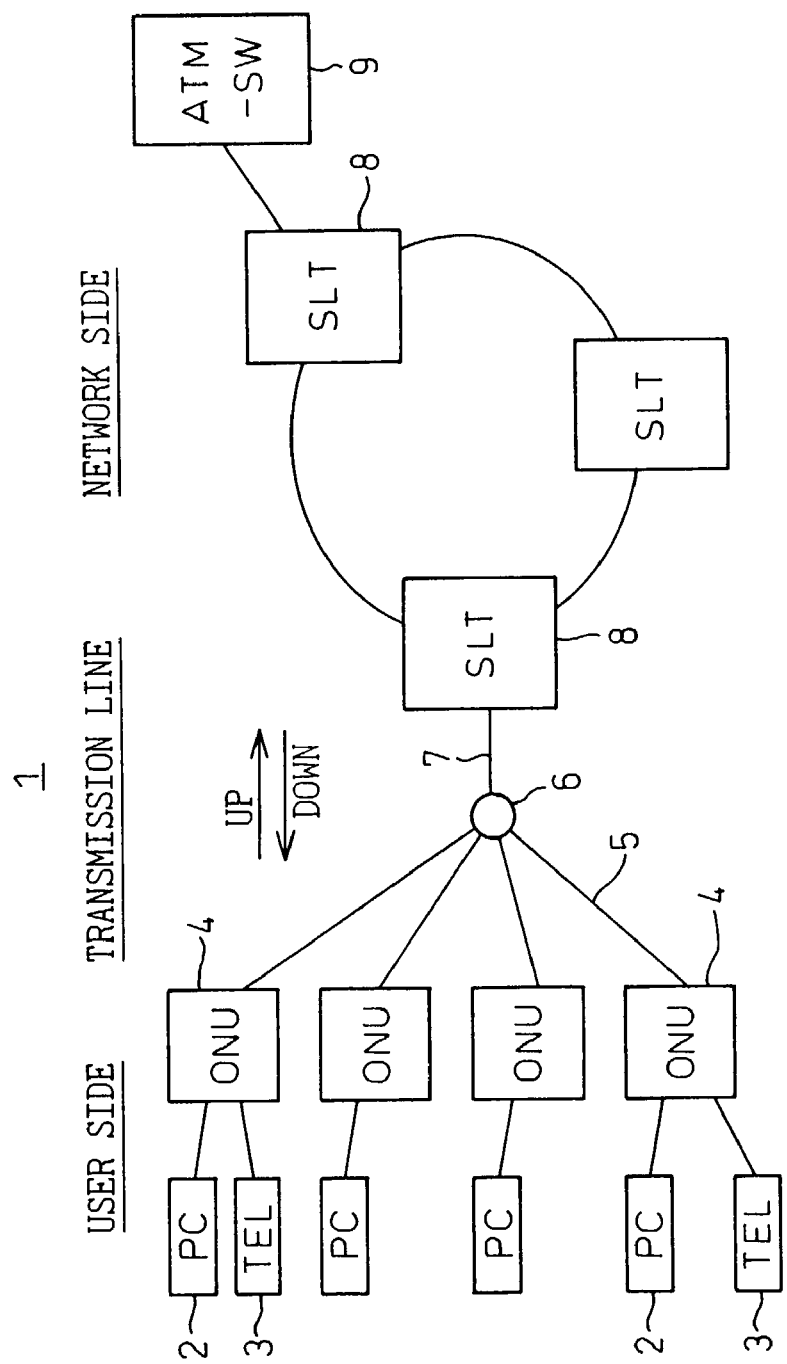
FIG. 12 is a view of a preferred example of a communication system to which the present invention is applied.

FIG. 12 is a view of a preferred example of a communication system to which the present invention is applied. This communication system is the above-mentioned ATM-PON communication system.

The communication system 1, as illustrated, is roughly comprised of a user side, a network side, and a transmission line connecting the two.

First, looking at the user side, this includes personal computers (PCs) 2, telephones (TEL) 3, and other apparatuses owned by the users. Each user apparatus transfers information with other user apparatuses (not shown) through an ATM switch (ATM-SW) 9 on the network side.

One characterizing feature of the ATM-PON communication system 1 is that, in order to achieve the above the transfer of information, a plurality of terminal units (optical network units (ONU)) 4 for each user and a single subscriber line terminal (SLT) 8 are provided, a single transmission line (optical fiber) 7 on the network side is shared by the plurality of terminal units 4 by polling, and thereby the information is transferred over that transmission line 7 by a time division multiplexing. For this, the plurality of user side transmission lines (optical fibers) 5 directly connected to the terminal units 4 are connected to a single network side transmission line 7 through a single photocoupler 6. This photocoupler 6 functions as a splitting/multiplexing apparatus.

FIG. 12 is meant to show the method of transfer of information on the transmission lines 5 and 7 and the framework of the subscriber line terminal (SLT) 8 for controlling the bandwidth of transfer of the information. In this case, the transfer of information is divided into uplink transfer of information from the terminal units 4 to the subscriber line terminal (SLT) unit 8 (uplink frames) ("UP" in the figure) and converse downlink transfer of information (downlink frames) ("DOWN" in the figure). The present invention particularly alludes to a proposed improvement relating to the uplink transfer of information.

Figure 13:
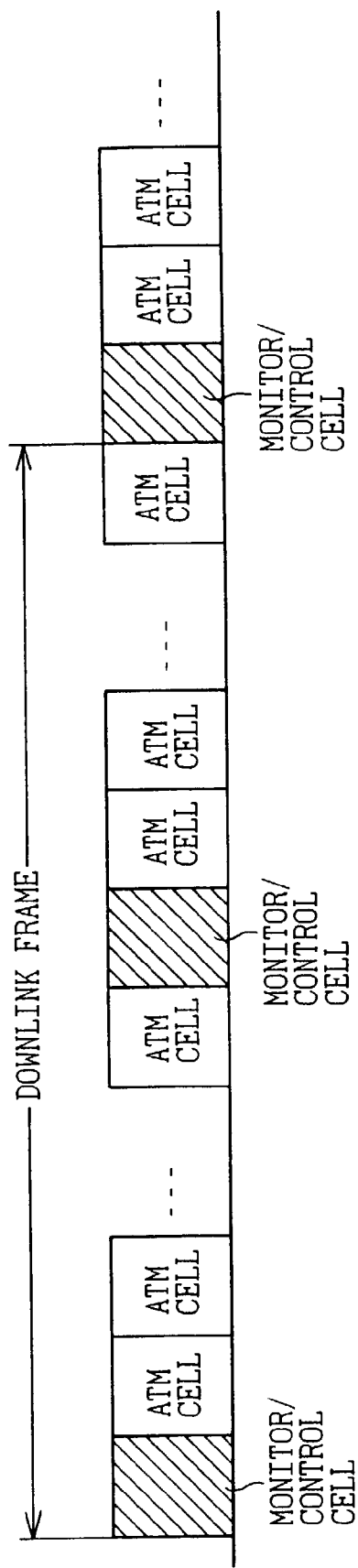
FIG. 13 is a view of the data format of a downlink frame on a transmission line.
Figure 14:
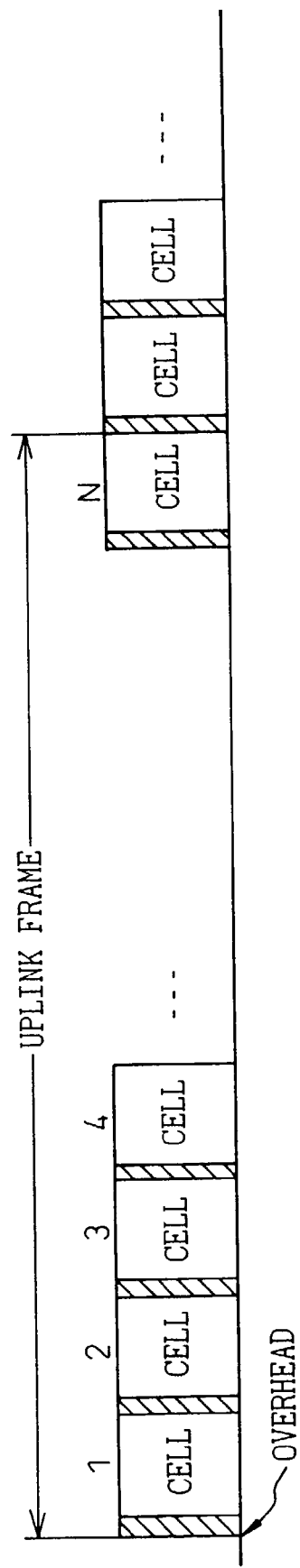
FIG. 14 is a view of the data format of an uplink frame on a transmission line.

The operation of the communication system of FIG. 12 will be explained next. Refer to FIG. 13, FIG. 14, and FIG. 15 as well for this explanation.

FIG. 13 is a view of the data format of a downlink frame on a transmission line, FIG. 14 is a view of the data format of an uplink frame on the transmission line, and FIG. 15 is a view of an example of the data format of polling information transferred by a downlink frame.

Referring to FIG. 12 to FIG. 15, cells are transmitted between the subscriber line terminal (SLT) unit 8 and the terminal units (ONU) 4 shown in FIG. 12 in the downward direction by the frame configuration shown in FIG. 13 and in the upward direction by the frame configuration shown in FIG. 14. In a downward direction frame (downlink frame) from the subscriber terminal unit 8 to the terminal unit (ONU) 4, monitor/control cells are transferred at specific positions in the frame.

On the other hand, in an upward frame (uplink frame) from the terminal unit (ONU) 4 to the subscriber line terminal (SLT) 8, the terminal unit (ONU) 4 uses a time slot designated by the subscriber line terminal (SLT) unit 8 by polling information (FIG. 15) to transfer the monitor/control cells, mixed with the ATM cells (user information), to the subscriber line terminal (SLT) 8.

Note that in FIG. 13, in actuality, each downlink frame is comprised of 56 cells and each cell is comprised of 53 bytes. On the other hand, in FIG. 14, in actuality, each uplink frame is comprised of 53 cells and each cell is comprised of 53 bytes and 3 bytes of overhead. Therefore, one downlink frame is comprised of 53×56 bytes in total, while one uplink frame is comprised of (53+3)×53 bytes in total, so the downlink frame and the uplink frame are completely synchronized in time.

The polling information manages transmission permission IDs for each terminal unit (ONU) 4. That is, the subscriber line terminal (SLT) unit 8 assigns one or more transmission permission IDs to each terminal unit (ONU) 4 in advance. In this case, each terminal unit (ONU) 4 obtains a grasp of the correspondence between the transmission permission ID and at least one buffer in the terminal unit (ONU) storing user information.

The subscriber line terminal (SLT) unit 8 determines the number of cells to be read from each buffer of the terminal units (ONU) 4 based on the amount of information stored in the buffer (queue length) notified from each terminal unit (ONU) 4 by an uplink frame at a fixed interval. That is, the subscriber line terminal (SLT) unit 8 determines the bandwidth to be assigned to each buffer in the terminal units (ONU) 4 (allocated bandwidth). The subscriber line terminal (SLT) unit 8 further determines the timing to read information from each buffer according to the amount of bandwidth assigned to each buffer. This read timing information is the above polling information.

The polling information (FIG. 15) produced by the subscriber line terminal (SLT) unit 8 is inserted into the monitor/control cells included in the downlink frames and transferred simultaneously to all of the terminal units (ONU) 4. The terminal units (ONU) 4 receiving them determine the timings to transmit their own cells by the uplink frames from the terminal units (ONU) 4 to the subscriber line terminal (SLT) unit 8 by the positions of the self-addressed transmission permission IDs shown by the polling information.

A specific example of the polling information is given in FIG. 15. Each terminal unit (ONU) 4 extracts the polling information from a downlink frame and finds the self-addressed transmission permission IDs. When a terminal unit (ONU) 4 finds the self-addressed transmission permission IDs, it inserts the cells read from the corresponding buffer in the terminal unit (ONU) 4 into the time slots in the uplink frames designated by the IDs to transmit them toward the subscriber line terminal (SLT) unit 8. For example, according to FIG. 15, the self-addressed transmission permission IDs for a certain terminal unit (ONU) 4 are Ox3d, Ox55 (second and fifth time slots from the head)

Further, the correspondence between the transmission permission IDs and buffers is for example Ox3d=Buffer 1, Ox55=Buffer 2

For example, when terminal unit (ONU) 4 set as above receives the polling information of FIG. 15 from the subscriber line terminal (SLT) unit 8, the terminal unit (ONU) 4 occupies the second time slots from the head in the uplink frames to transmit the information read from the first buffer (Buffer 1) in the terminal unit (ONU) 4 to the subscriber line terminal (SLT) unit 8. Further, it uses the fifth time slots from the head of the uplink frames to transmit information read from the second buffer (Buffer 2) in the terminal unit (ONU) 4 to the subscriber line terminal (SLT) unit 8.

By changing the transmission bandwidth of the cells dynamically in accordance with the communication state of each terminal unit (ONU) 4 in this way, the subscriber line terminal (SLT) unit 8 can efficiently handle IP data traffic or other strongy burst-like traffic. This is the dynamic bandwidth allocation system for handling variable rate traffic.

Next, the hardware configuration for realizing this dynamic bandwidth allocation system will be explained.

Figure 16:
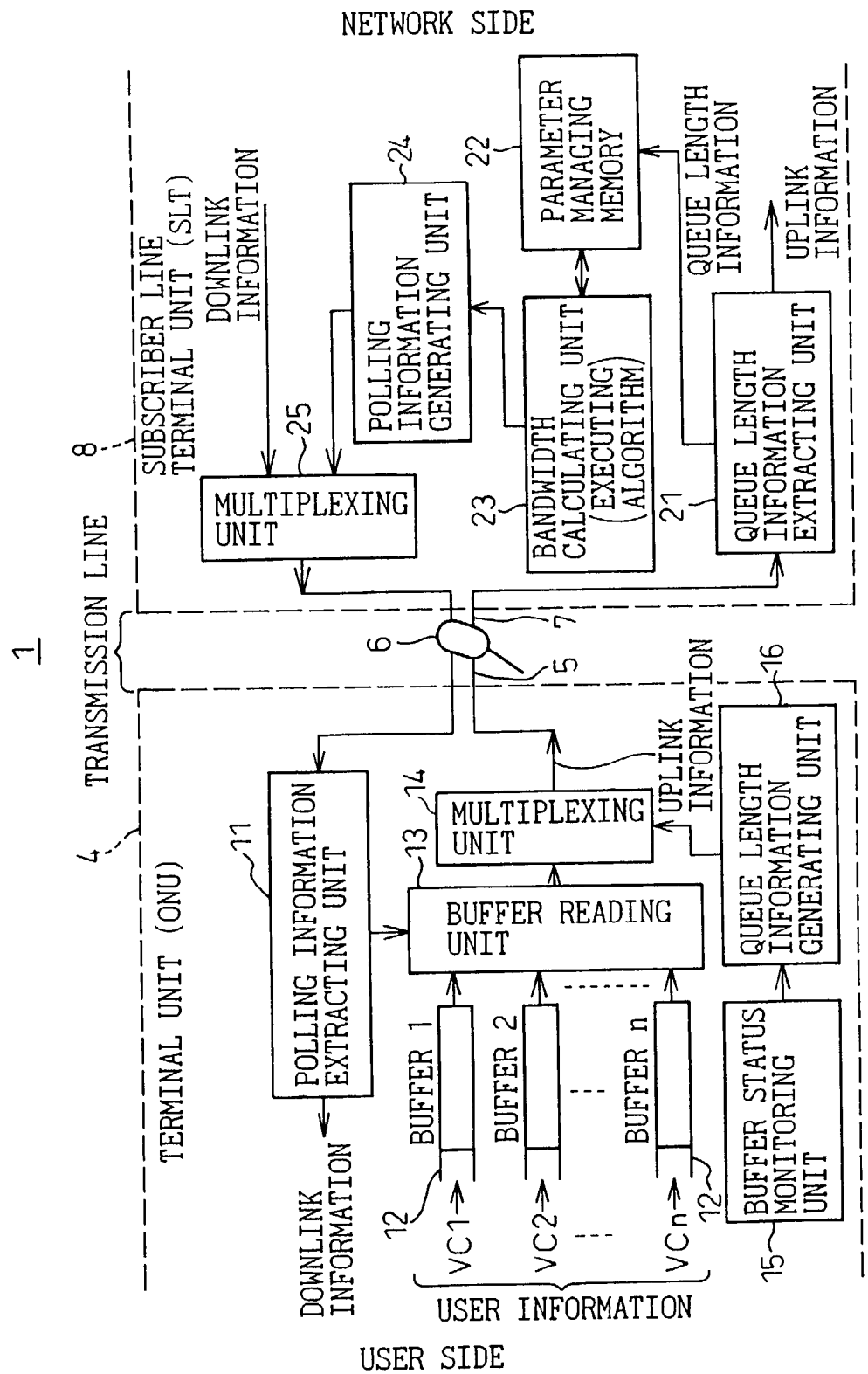
FIG. 16 is a view of the basic configuration of a terminal unit 4 and a subscriber line terminal (SLT) unit 8.

FIG. 16 is a view of the basic configurations of a terminal unit (ONU) 4 and the subscriber line terminal (SLT) unit 8.

Note that throughout the figures, similar components are assigned the same reference numerals or symbols.

The terminal unit (ONU) 4 at the left side of the figure is comprised of a polling information extracting unit 11 for receiving user directed information comprised of the polling information from the subscriber line terminal (SLT) 8 by a downlink frame and downlink information from another party and extracting the polling information from it; a plurality of buffers 12 momentarily storing the uplink information from existing user apparatuses for respective connections (VC1, VC2, . . . VCn); a buffer reading unit 13 for reading the user information stored in the buffers 12; a buffer status monitoring unit 15 for monitoring the fullness (buffer status) of the amounts of information in the buffers 12 (that is, the queue lengths); a queue length information generating unit 16 for generating information relating to the queue lengths in the buffers 12 based on the results of monitoring by the buffer status monitoring unit 15; and a multiplexing unit 14 for multiplexing the queue length information and the user information from the buffer reading unit 13 and transmitting the same to the transmission line 5.

On the other hand, the subscriber line terminal (SLT) unit 8 at the right side of FIG. 16 is comprised of a queue length information extracting unit 21 for extracting the queue information from the uplink information transferred from the terminal unit (ONU) 4 side and sending other user information to the network side; a parameter managing memory 22 for recording the extracted queue length information and necessary parameter information (explained later) and managing the same; a bandwidth calculating unit 23 for executing an algorithm using the management information recorded in the parameter managing memory 22 to calculate and determine the bandwidth to assign to each buffer 12; a polling information generating unit 24 for generating the above-mentioned polling information in accordance with the above bandwidth determined by the above calculation; and a multiplexing unit 25 for multiplexing the user information from the other party (downlink information) and the polling information from the polling information generating unit 24 and transferring the same as user directed information to the terminal unit (ONU) 4 side.

Therefore, the series of operations of the communication system 1 as a whole shown in FIG. 16 may be summarized as follows:

The cells including the user information sent from the user side are stored in any of the buffers 12, that is, the Buffer 1 to Buffer n, in accordance with the connection information (VC identifier). The buffer reading unit 13 reads the cells from the buffers 12 using the time slots of the timings designated by the polling information sent from the subscriber line terminal (SLT) 8 and transfers the same to the subscriber line terminal (SLT) unit 8.

Further, the queue length generating unit 16 in the terminal unit (ONU) 4 sends the queue lengths in the buffers 12 monitored by the buffer status monitoring unit 15 to the subscriber line terminal (SLT) unit 8 through the multiplexing unit 14. At this time, the user information from the user side and the above queue length information are multiplexed by the multiplexing unit 14 as explained above.

The subscriber line terminal (SLT) unit 8 extracts the queue length information transferred from each terminal unit (ONU) 4 through the transmission lines 5 and 7 by the queue length information extracting unit 21 inside it. Further, the bandwidth calculating unit 23 determines the bandwidth to allocate to each buffer (for each connection VC) based on the queue length of each buffer 12 notified every bandwidth update period. Next, the polling information generating unit 24 assigns the timings of the time slots to be used in accordance with the bandwidth size allocated to each connection (VCi) and generates polling information for instructing that allocation. This polling information is inserted into the monitor/control cells of the downlink frames and delivered to each terminal unit (ONU) 4.

Here, the framework of the above polling and the fluctuation occurring due to the polling will be briefly explained.

Figure 17:
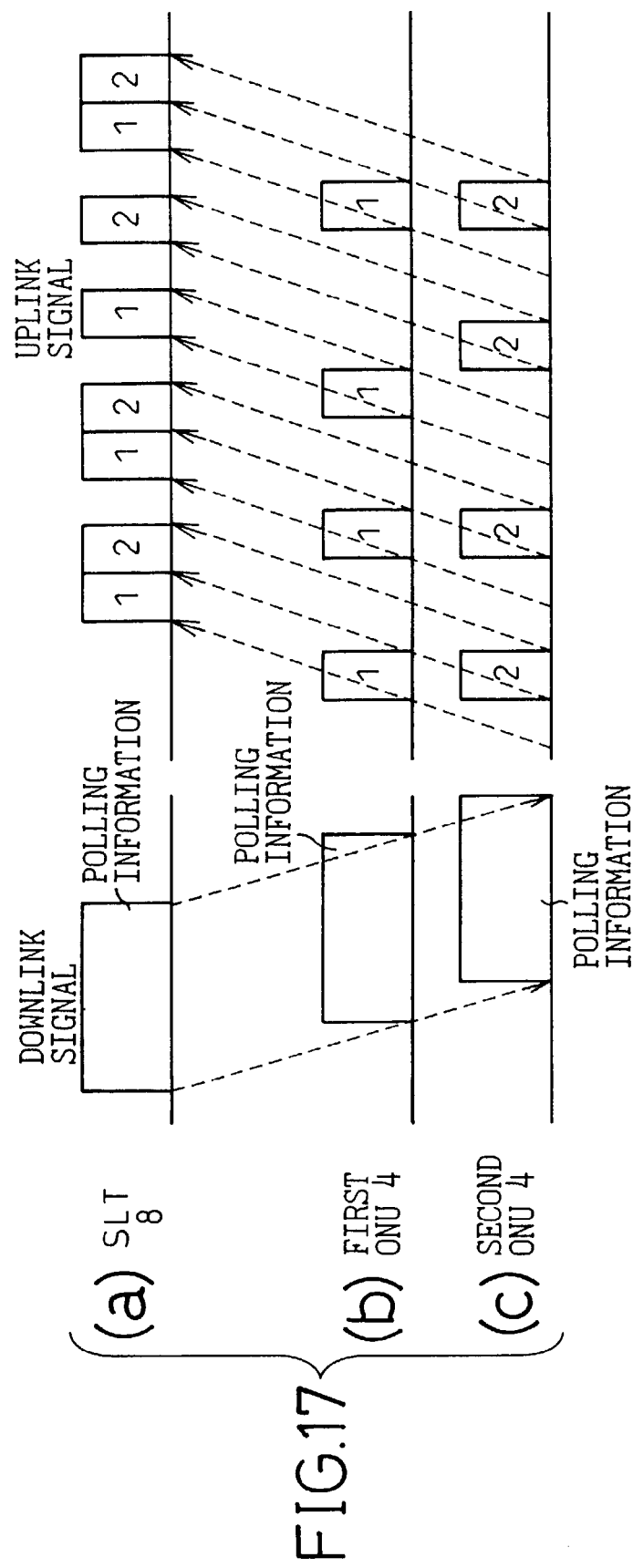
FIG. 17 is a view explaining the framework of polling.
Figure 18:
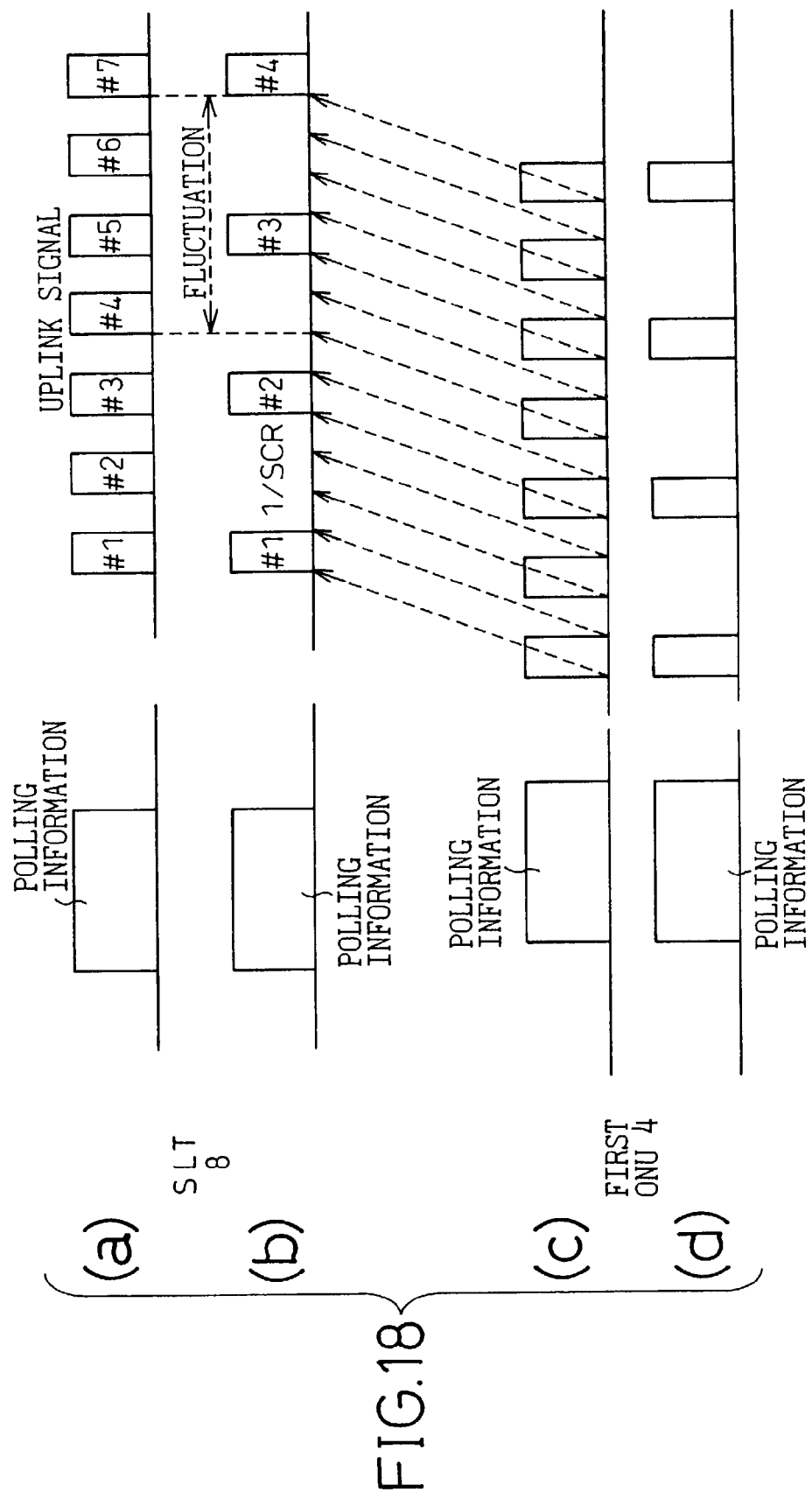
FIG. 18 is a view explaining fluctuation occurring due to polling.

FIG. 17 is a view explaining the framework of polling, while FIG. 18 is a view explaining the fluctuation occurring due to polling.

First, referring to FIG. 17, the left side (downlink signal) of the row (a) of the figure shows the polling information transferred by a downlink frame from the subscriber line terminal (SLT) unit 8. This polling information is received by a first terminal unit (ONU) 4 and a second terminal unit (ONU) 4 as shown at the left sides in the rows (b) and (c) through the transmission lines 7 and 5. Note that for simplification, only two terminal units (ONU) are shown.

The first and second terminal units (ONU) 4 read from their respective buffers 12 the user information using the time slots (shown by 1 and 2) designated in accordance with the already explained transmission permission IDs shown by the received polling information. The signals are shown at the right sides of the row (b) and row (c) (uplink signals). They are multiplexed at the photocoupler 6 and reach the subscriber line terminal (SLT) unit 8 as shown at the right side in row (a) of the figure as uplink frames. Note that uplink signals and downlink signals are optical signals of different wavelengths from each other, so full duplex communication where information is simultaneously transferred up and down over the same optical fiber becomes possible.

Next, referring to FIG. 18, the row (a) and row (b) in the figure are timing charts relating to the subscriber line terminal (SLT) unit 8. Row (c) and row (d) in the figure are timing charts relating to any terminal unit (ONU) 4, here, for example, the first terminal unit (ONU) 4.

Further, in the timing charts of the figure, only the first to seventh time slots #1 to #7 among the 53 time slots are shown for simplification.

As the allocated bandwidth for the transfer of the cells from each terminal unit (ONU) 4 to the subscriber line terminal (SLT) unit 8, often a predetermined sustainable cell rate (SCR) is given. Timing charts for the case of transmitting cells from a terminal unit (ONU) 4 to the subscriber line terminal (SLT) unit 8 while strictly observing the sustainable cell rate (SCR) are given in row (b) and row (d) of the figure. That is, as shown in row (b) of the figure, the uplink cells arrive at the subscriber line terminal (SLT) 8 at predetermined intervals of 1/SCR. Therefore, no fluctuation occurs.

If the amount of information to be transmitted from the terminal unit (ONU) 4 increases, however, the interval of transmission of the uplink cells from the terminal unit (ONU) 4 becomes shorter than 1/SCR. That is, originally speaking the uplink cells from the terminal unit (ONU) 4 should reach the subscriber line terminal (SLT) 8 by the timing shown in row (b) of the figure (#1→#2→#3→ . . . ), but in fact they arrive at the subscriber line terminal (SLT) unit 8 by the timing shown in row (a) of the figure (#1→#2→#3→ . . . )

Here, a deviation in timing of arrival of the uplink cells arises between row (a) and row (b). This deviation is the above-mentioned "fluctuation". In this figure, only the fluctuation when taking note of one time slot #4 is shown. This fluctuation accumulates along with the time slots #1, #2, #3, . . . The fluctuation at the time of the end of one uplink frame therefore becomes considerably large in size. This accumulated fluctuation must be kept less than the burst tolerance (BT) predetermined by the protocol.

In the dynamic bandwidth allocation system for handling variable rate traffic, the above fluctuation is one of the important factors determining the quality of communication. Further, it is deeply related to the present invention. Therefore, some additional explanation will be given here of the above variable traffic rate while referring to the drawings.

Figure 19:
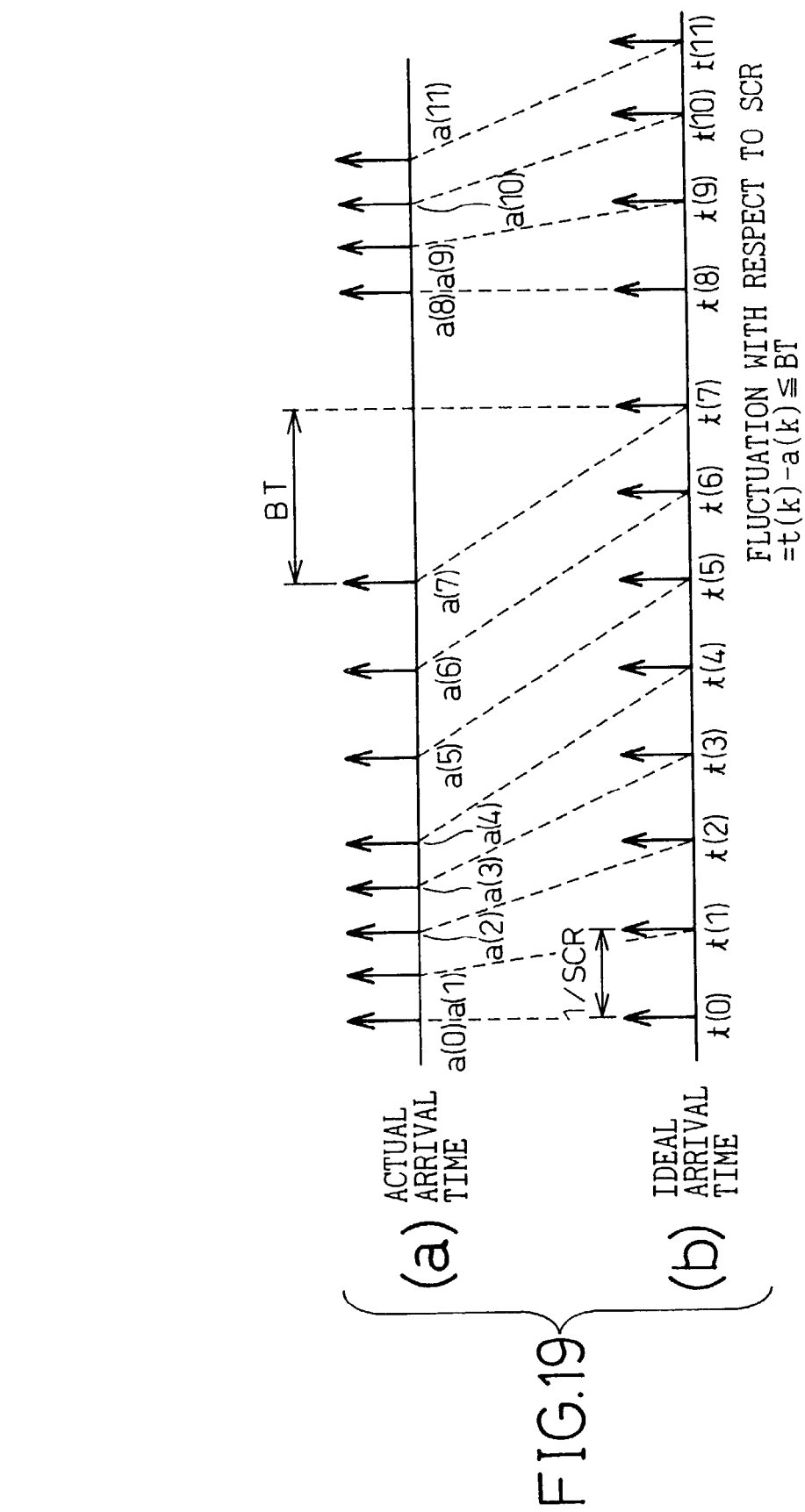
FIG. 19 is a timing chart of fluctuation of variable bit rate (VBR) traffic with respect to a sustainable cell rate (SCR)
Figure 20:
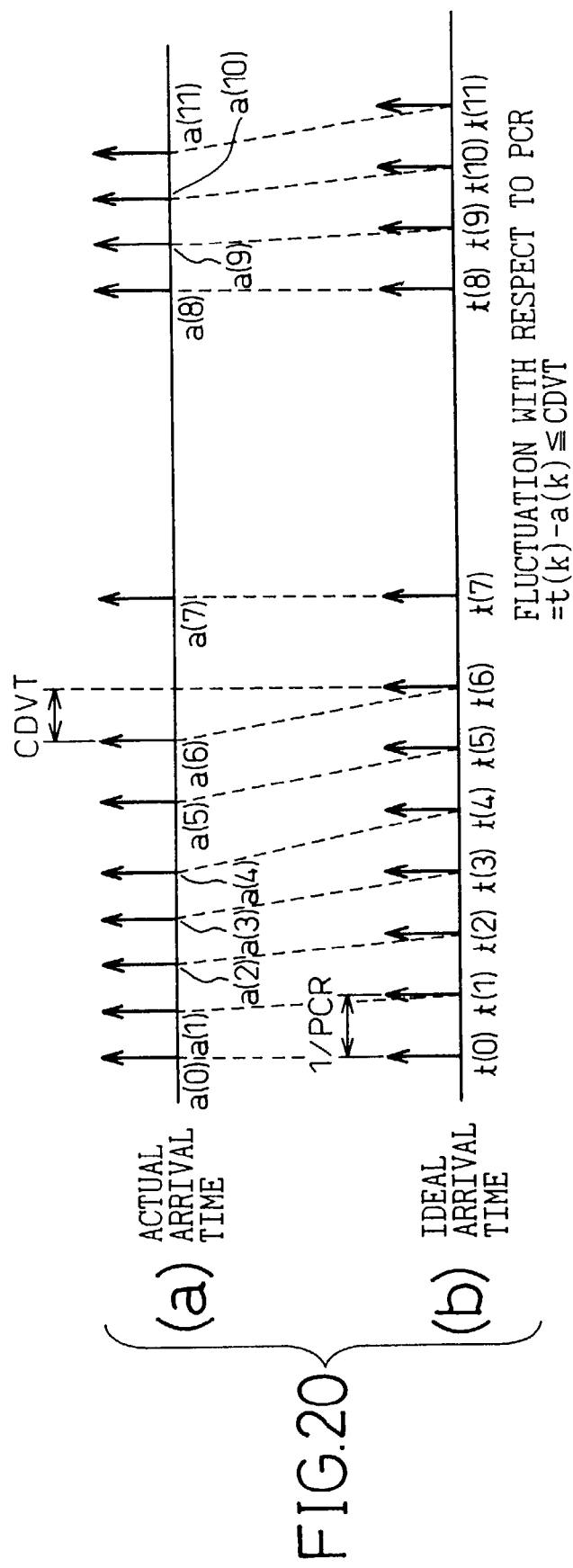
FIG. 20 is a timing chart of fluctuation of variable bit rate (VBR) traffic with respect to a peak cell rate (PCR)

FIG. 19 is a timing chart of the fluctuation in variable bit rate (VBR) traffic with respect to the sustainable cell rate (SCR), while FIG. 20 is a timing chart of the fluctuation of variable bit rate (VBR) traffic with respect to the peak cell rate (PCR).

Along with the rapid spread of the Internet, a technique for efficiently handling data traffic has become necessary even in ATM-PON communication systems. This data traffic is variable rate traffic of a strong burst nature. In an ATM-PON communication system, in general it is handled by the VBR (variable bit rate) class.

The specifications of the variable bit rate (VBR) class are defined in ATM-Forum Traffic Management 4.1. The variable bit rate (VBR) class is managed by the parameters of the peak cell rate (PCR) (that is, maximum bandwidth), cell delay variance tolerance (CDVT) (that is, fluctuation with respect to maximum bandwidth), sustainable cell rate (SCR) (sustainable cell rate), and burst tolerance (BT) (value of fluctuation allowable with respect to SCR).

The network normally guarantees transfer of data by the sustainable cell rate (SCR) to all connections handled by the network. If there is further unused capacity in the network to handle traffic, the data can be transferred by the maximum bandwidth (PCR) in the range where the fluctuation does not exceed the burst tolerance (BT). Therefore, at the time of new registration of a connection, the carrier decides whether it is possible to guarantee the sustainable cell rate for a new connection based on the parameters reported from the user and the network resource information. When deciding that it is not possible, it rejects the new registration. When all variable bit rate (VBR) connections are allowed according to their reported parameters, this means the quality can be guaranteed for the reported parameters.

Row (a) and row (b) of FIG. 19 correspond to row (a) and row (b) of the above FIG. 18. In FIG. 19, the size of the fluctuation with respect to the sustainable cell rate (SCR) is shown by $t(k)-a(k)$. Here, $a(k)$ is the actual arrival time of a cell k, while $t(k)$ is the ideal arrival time. The "ideal arrival time" is the arrival time of the cell k when assuming that the cells from the terminal unit (ONU) 4 arrive at the subscriber line terminal (SLT) unit 8 at a rate not more than the sustainable cell rate (SCR). Here, the fluctuation with respect to the sustainable cell rate (SCR) must be limited to not more than the illustrated burst tolerance (BT).

On the other hand, referring to FIG. 20, the size of the fluctuation with respect to the maximum bandwidth (PCR) can be calculated by using the ideal arrival time assuming the cells from the terminal unit (ONU) 4 arrive at the subscriber line terminal (SLT) unit 8 at not more than the peak cell rate (PCR). At this time, the fluctuation with respect to the peak cell rate (PCR) must be limited to not more than the above cell delay variance tolerance (CDVT).

Showing the conventional bandwidth allocation system for cells in more detail based on the general summary of the ATM-PON communication system given above, in a conventional ATM-PON communication system, when handling variable bit rate (VBR) traffic, roughly speaking, either of the fixed bandwidth allocation system or the dynamic bandwidth allocation system has been applied. More specifically, these include the fixed sustainable cell rate (SCR) allocation system (System 1), the fixed peak cell rate (PCR) allocation system (System 2), and the dynamic bandwidth allocation system (System 3).

The above System 1 and System 2, however, each have their own disadvantages. Further, System 3 has the problems explained later. This will be explained in detail below.

In the following explanation, a connection accommodating a buffer i (see Buffer 1, Buffer 2, ... Buffer n of buffers 12 in FIG. 16) is expressed as VCi, where the suffix "i" is used to identify a particular connection (i=1, 2 ... n). Next, the above System 1, System 2, and System 3 will be explained in that order.

System 1: Fixed Sustainable Cell Rate (SCR) Allocation System

The subscriber line terminal (SLT) unit 8 allocates a fixed sustainable cell rate (SCR) parameter Si to each connection VCi. That is, the allocated bandwidth Bi and the sustainable cell rate SCRi are in the following relationship:

$$Bi=SCRi$$

Figure 21:
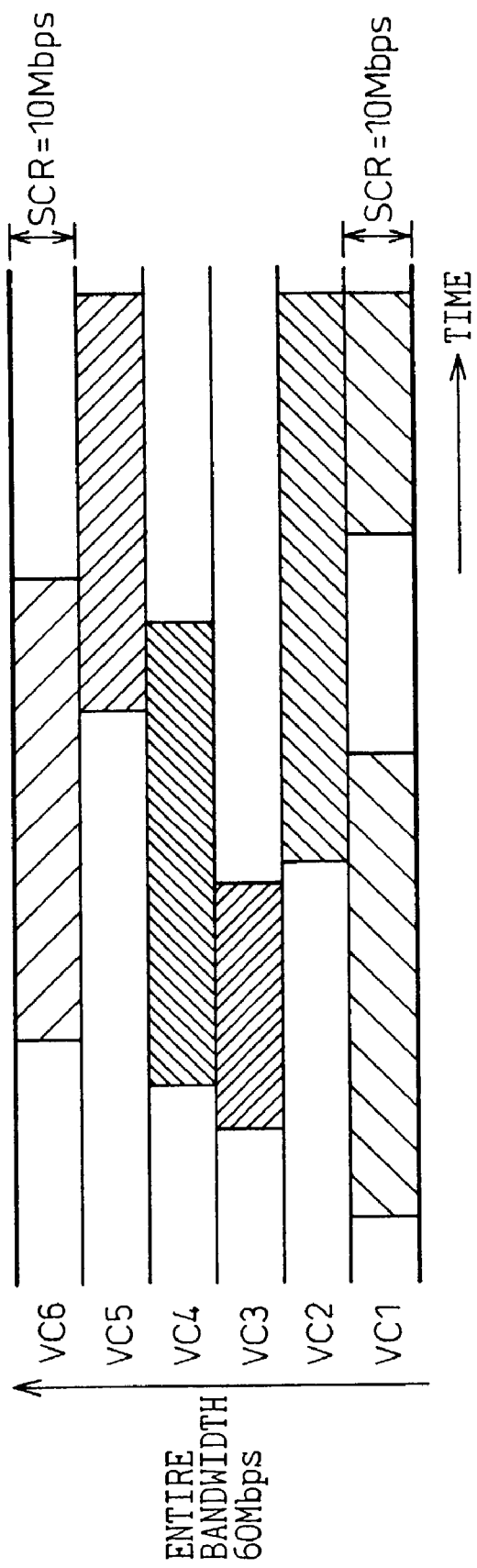
FIG. 21 is a view of an example of a model of bandwidth allocation under a fixed sustainable cell rate (SCR) allocation system.

FIG. 21 is a view of an example of a model of bandwidth allocation under the fixed sustainable cell rate (SCR) allocation system.

In this model, there are six connections (VC1 to VC6) overall. Each is allocated a fixed sustainable cell rate (SCR) of 10 Mbps.

In System 1, when a user transmits cells by more than the sustainable cell rate (SCR), the queue length and the delay time in queue increase. Therefore, there are the disadvantages that it is not possible to handle real time traffic sensitive to delay such as TV conferences, that a large buffer capacity is required to prevent overflow of cells in the buffers 12 in each terminal unit (ONU) 4, and that unused bandwidth cannot be used, so the efficiency of data transfer is poor.

System 2: Fixed Peak Cell Rate (PCR) Allocation System

The subscriber line terminal (SLT) unit 8 allocates a fixed peak cell rate (PCR) parameter Pi to each connection VCi. That is, the allocated bandwidth size Bi and the peak cell rate PCRi are in the following relationship:

$$Bi=PCRi$$

FIG. 22 is a view of an example of a model of bandwidth allocation under the fixed peak cell rate (PCR) allocation system.

In this model, there are the restrictions that the sustainable cell rate (SCR) is 10 Mbps and the peak cell rate (PCR) is 30 Mbps. Looking at the connection VC1, it occupies a bandwidth up to the peak cell rate (PCR) over the limit of SCR=10 Mbps, so it is not desirable for the other connection VC3 to further occupy bandwidth simultaneously.

In System 2, the peak cell rate (PCR) is allocated to each connection VCi regardless of the amount of traffic. Therefore, there are the disadvantages that the number of connections which can be handled is limited and the efficiency of service is poor and that even the sustainable cell rate (SCR) and burst tolerance (BT) parameters cannot be satisfied.

Further, at the variable bit rate (VBR) class, it is assumed that the data is transmitted while each connection VCi observes the parameters. Therefore, if handling a connection not observing the parameters, the flow of traffic cannot be maintained with the buffer capacity or transmission line capacity prepared in advance and the disadvantages of cell discard, cell delay, or other serious deteriorations in quality arise.

System 3: Dynamic Bandwidth Allocation System

There are various types of System 3, but here the explanation will be made of the typical queue length proportional allocation system (Japanese Unexamined Patent Publication (Kokai) No. 10-242981).

In System 3, the allocated bandwidth Bi is changed in accordance with the queue length information Qi of a buffer i handling a connection VCi. That is, the following relationship stands between Bi and Qi:

$$Bi = SH \cdot Qi/\Sigma Qi$$

where, SH is the sharable bandwidth (total bandwidth)

FIG. 23 is a view of an example of a model of bandwidth allocation under the dynamic bandwidth allocation system.

In this model, in the same way as FIG. 21 or FIG. 22, the sustainable cell rate (SCR) is set to 10 Mbps and peak cell rate (PCR) to 30 Mbps. Further, there are six connections VC1 to VC6.

In System 3, efficient handling of data traffic becomes possible by sharing the unused network resources among the connections VCi. However, the parameters of the burst tolerance (BT), peak cell rate (PCR), and sustainable cell rate (SCR) cannot be satisfied. Therefore, the same disadvantages arise as with the above System 2.

A specific example of the operation will be explained next. For simplification, the number of connections VCi for the dynamic bandwidth allocation will be limited to four (VC1 to VC4). Each terminal unit (ONU) 4 notifies the subscriber line terminal (SLT) unit 8 of the queue lengths of the buffers 12 for each connection VCi at predetermined intervals. The parameters at this time are assumed to be as in the following Table 1 and Table 2:

TABLE 1

| Parameters Common to Connections VCi | |
|---|---|
| Transmission line capacity C (cells/sec) | 10,000 |
| Sharable bandwidth SH (cells/sec) | 8,000 |
| Bandwidth update period Tupdate (slots) | 1,000 |
| Bandwidth update period start time A (slot) | 4,000 |

TABLE 2

| | Parameters Different for Connections VCi | | | |
|---|---|---|---|---|
| VC | PCRi (cells/sec) | SCRi (cells/sec) | BTi (cells) | Qi (cells) |
| 1 | 3000 | 1000 | 2500 | 600 |
| 2 | 3000 | 1000 | 2500 | 250 |
| 3 | 3000 | 1000 | 2500 | 50 |
| 4 | 3000 | 1000 | 2500 | 300 |

Note that in Table 2, PCRi, SCRi, and BTi are values preset by contract, while Qi is the actual value of the queue length of a buffer i at a certain time.

Continuing with the explanation of the example of operation, first, the subscriber line terminal (SLT) unit 8 determines the bandwidth size Bi allocated to each connection VCi by the following equation from the queue length information Qi:

$$Bi = C^* Qi/\Sigma Qi:$$

An example of the results of calculation by this equation is shown in the following Table 3:

TABLE 3

| Example of Bandwidth Allocation by System 3 | |
|---|---|
| VC | Allocated bandwidth Bi (cells/sec) |
| 1 | 5000.00 |
| 2 | 2083.33 |
| 3 | 416.67 |
| 4 | 2500.00 |

Comparing Table 3 with Table 2, in the end, no consideration is taken at all of the peak cell rate (PCR), sustainable cell rate (SCR), burst tolerance (BT), and other parameters. Therefore, the problem is caused that a large bandwidth is continuously allocated without end to connections VCi with large numbers of cells accumulated in the buffers. Therefore, the subscriber line terminal (SLT) unit 8 can no longer effectively utilize the communication resources as scheduled.

Therefore, the present invention provides a dynamic bandwidth allocation method and apparatus designed to improve the efficiency of transfer of information in a communication system handling variable rate traffic and simultaneously ensure that the peak cell rate (PCR), sustainable cell rate (SCR), burst tolerance (BT), and other contracted parameters are observed by shaping the allocated bandwidths.

FIG. 1 is a view of the basic configuration of a network side transmission apparatus according to the present invention.

The network side transmission apparatus 30 of this figure forms a repeater between the user side and network side in a general communication system. In the already explained ATM-PON communication system, however, the network side transmission apparatus 30 corresponds to the already explained subscriber line terminal (SLT) 8.

The basic configuration of this figure covers three embodiments. In each embodiment, the network side transmission apparatus 30 designates the timings of transfer of information for a plurality of terminal units (ONU) 4 on the user side and receives information transferred from these terminal units 4 by time division multiplexing at the designated transfer timings. It controls the variable rate traffic by dynamic bandwidth allocation.

The network side transmission apparatus 30 of the present invention, as shown in the figure, include an allocating means 31 and a computing means 32.

First Embodiment

The allocating means 31 assigns allocated bandwidth (Bi) for transfer to the connection VCi periodically according to the amounts of information to be transferred for the connection stored in the terminal unit 4.

The computing means 32 computes the allocated bandwidth Bi so that the contracted parameter (Si) relating to the sustainable cell rate (SCR) and the contracted parameter relating to the fluctuation value (BT) allowed for the sustainable cell rate (SCR) preset for each connection VCi are observed.

Second Embodiment

The allocating means 31, in the same way as above, assigns allocated bandwidth Bi for transfer to the connection VCi periodically according to the amounts of information to be transferred for the connection stored in the terminal unit 4.

The computing means 32, unlike the above, compute the allocated bandwidth Bi so that the contracted parameter (Pi) relating to the peak cell rate (PCR) and the contracted parameter relating to the fluctuation value (CDVT) allowed for the peak cell rate (PCR) preset in each connection VCi are observed.

Third Embodiment

The allocating means 31, in the same way as above, assigns allocated bandwidth Bi for transfer to the connection VCi periodically according to the amounts of information to be transferred for the connection stored in the terminal unit 4.

The computing means 32, unlike the above, computes the allocated bandwidth Bi so that the contracted parameters (Si/Pi) relating to the sustainable cell rate (SCR) and peak cell rate (PCR) and the contracted parameters (Si/Pi) relating to the fluctuation values (BT/CDVT) allowed for the sustainable cell rate (SCR) and peak cell rate (PCR) preset for each connection VCi are observed.

Among the three embodiments, the third embodiment enables the contracted parameters to be observed most strictly.

FIG. 2 is a flow chart of the method of control of variable rate traffic according to the present invention.

This method is applied, as mentioned above, to a network side transmission apparatus 30 which designates the timings of transfer of information for a plurality of terminal units on the user side, receives information transferred from these terminal units by time division multiplexing at the designated transfer timings, and controls the variable rate traffic by dynamic bandwidth allocation.

Here, the method of the present invention includes steps S11, S12, and S13 shown in FIG. 2.

At step S11, the apparatus receives the amounts of information to be transferred to the connection VCi stored in the terminal unit 4.

At step S12, the apparatus computes the allocated bandwidth based on the received amounts of information to be transferred so that at least the contracted parameter (Si) relating to the sustainable cell rate (SCR) and the contracted parameter relating to the fluctuation value (burst tolerance (BT)) allowed for the sustainable cell rate (SCR) are observed among the contracted parameters (Si/Pi) relating to the sustainable cell rate (SCR) and peak cell rate (PCR) and contracted parameters relating to the fluctuation values (BT/CDVT) allowed for the sustainable cell rate (SCR) and peak cell rate (PCR) preset for each connection VCi.

At step S13, the apparatus assigns the computed allocated bandwidth to the connection (VCi) and notifies the terminal unit 4.

FIG. 3 is a block diagram of the communication system according to the present invention.

The communication system 1 has, at the user side, a plurality of terminal units 4 for reading and transferring information by time division multiplexing from internal buffers set to respective connections VCi at the designated timings for transfer of the information.

On the other hand, the system 1 has, at the network side, a network side transmission apparatus 30 (SLT 8) which designates the timings of transfer of information for the terminal units 4, receives information read and transferred from the buffers in these terminal units 4, and controls the variable rate traffic by dynamic bandwidth allocation.

Between the network side transmission apparatus 30 and the plurality of terminal units 4, the system has a time division multiplex transmission line which transfers polling information designating the transfer timings to the plurality of terminal units 4 and transfers the information from the buffers to the network side transmission apparatus 30 at the designated transfer timings. Further, the network side transmission apparatus 30 includes an allocating means 31 for assigning allocated bandwidth for transfer to the connection VCi periodically in accordance with the amounts of information to be transferred for the connection VCi stored in each of the buffers and a computing means 32 for computing the allocated bandwidth so that at least the contracted parameter (Si) relating to the sustainable cell rate (SCR) and the contracted parameter relating to the fluctuation value (burst tolerance (BT)) allowed for the sustainable cell rate (SCR) are observed among the contracted parameters (Si/Pi) relating to the sustainable cell rate (SCR) and peak cell rate (PCR) and contracted parameters relating to the fluctuation values (BT/CDVT) allowed for the sustainable cell rate (SCR) and peak cell rate (PCR) preset for the connection VCi.

Therefore, according to the present invention, the network side transmission apparatus 30 can observe the traffic parameters of the sustainable cell rate (SCR) and burst tolerance (BT) and further the peak cell rate (PCR) and cell delay variance tolerance (CDVT) to the extent possible and effectively utilize the system resources.

Next, the communication system 1 according to the present invention, in particular the network side transmission apparatus 30 (FIG. 1), will be explained in further detail taking as an example the above subscriber line terminal (SLT) unit 8.

FIG. 4 is a view of a concrete example of the configuration of a subscriber line terminal (SLT) unit 8 according to the present invention.

The subscriber line terminal (SLT) unit 8, as illustrated, is provided with a queue length extracting function unit 41, a parameter setting function unit 42, a parameter managing memory 43, a bandwidth calculating function unit 44, and a polling information generating function unit 45.

The queue length extracting function unit 41 receives notifications relating to the queue lengths of information stored for the connections VCi in the buffers 12 (FIG. 16) of the terminal units from the terminal units 4 and extracts the queue lengths.

The parameter setting function unit 42 sets at least one of the contracted parameter (Si) relating to the sustainable cell rate (SCR), the contracted parameter (Pi) relating to the peak cell rate (PCR), and the contracted parameters relating to the fluctuation values (BT/CDVT) allowed for the sustainable cell rate (SCR) and peak cell rate (PCR) for the connections contracted for with each terminal unit 4.

The parameter managing memory 43 stores at least the queue length information and contracted parameter information input from the queue length extracting function unit 41 and the parameter setting function unit 42.

The bandwidth calculating function unit 44 periodically calculates the allocated bandwidths Bi for the connections VCi so that the contracted parameters are observed and re-stores the results of the calculation in the parameter managing memory 43.

Further, with an ATM-PON communication system, the polling information generating function unit 45 is essential. This polling information generating function unit 45 determines the timings of transfer of information to be designated for the terminal units (ONU) 4 in accordance with the allocated bandwidths Bi of the results of calculation re-stored in the parameter managing memory 43 and transfers them as polling information to the terminal units (ONU) 4 through the transmission lines 7 and 5.

This will be explained in further detail below. To speed understanding, first the meanings of the abbreviations used in the explanation will be listed.

[Meaning of Abbreviations]
PCR: Peak cell rate, that is, peak bandwidth
CDVT: Cell delay variance tolerance, that is, fluctuation value with respect to peak cell rate (PCR)
SCR: Sustainable cell rate, that is, sustainable bandwidth
BT: Burst tolerance, that is, fluctuation value with respect to sustainable cell rate (SCR)
BT': Provisional burst tolerance
Si: Parameter of sustainable cell rate
Pi: Parameter of peak cell rate
VCi: Connection (Virtual Connection)
Qi: Queue length information of connection VCi
Bi: Bandwidth allocated to connection VCi
SH: Sharable bandwidth (entire bandwidth)
C: Transmission capacity
B'i: Queue length converted bandwidth (' shows provisional nature)
A.HEAD'i: Last scheduled arrival time
A: Start time of bandwidth update period
Ti: Ideal arrival time (before update)
C/Si: Time interval of ideal arrival time (slots)
T.HEAD'i: Ideal arrival time of last cell
Tupdata: Bandwidth update period
T-LASTi: Previous last ideal arrival time
Ai: Scheduled arrival time
N'i: Number of allocated time slots in bandwidth update period (=Tupdate*B'i/C)
A'i: Provisional scheduled arrival time of last time slot
C/B'i: Allocated time slot (=interval of scheduled arrival time)
T'i: Ideal arrival time of last cell
Ni: Number of allocated time slots The bandwidth calculating function unit 44 of the subscriber line terminal (SLT) unit 8 reads the amounts of information in the buffers 12 transmitted from the terminal units (ONU) 4 through the transmission lines 5 and 7 at each bandwidth update period (Tupdate (slots)) and parameter information in the parameter managing memory 43 to calculate the allocated bandwidths Bi for the connections VCi.

The polling information generating function unit 45 generates polling information from the allocated bandwidths Bi for the connections VCi. All of the information required for the calculation of bandwidth is managed in the parameter managing memory 43.

The parameter managing memory 43 stores the setting information of the system required for bandwidth calculation (bandwidth update period Tupdate, transmission line capacity C, etc.), the contracted parameter information for each connection VCi (PCR, SCR, BT, CVDT, etc.), and the variables required for the bandwidth calculation (ideal arrival time Ti etc.) The variable information is updated for every calculation. The basic operation of the bandwidth calculating function unit 44 will be explained below.

Assume here that for all of the allocated time slots, the cells of the uplink frames return to the subscriber line terminal (SLT) unit 8 without being discarded. Since the arrival times of the cells can be predicted from the allocated times of the time slots, the allocated times of the time slots are called the scheduled arrival times of the cells here.

First, the unit calculates the queue length converted bandwidths B'i (B'i being the provisional values of Bi found by initial calculation) from the queue lengths of the connections VCi. When allocating these bandwidths B'i to the connections VCi, the time slots of $$N'i = T\text{update} * B'i/C$$

are allocated in the bandwidth update period (Tupdate).

Assuming that the time slots addressed to the connections VCi are assigned at equal intervals in this bandwidth update period, the interval of allocated time slots becomes $$C/B'i \text{ (slots)}$$

This being the case, the last allocated time slot time (last scheduled arrival time) A-HEAD'i in the bandwidth update period becomes $$A.\text{HEAD}'i = A + (N'i - 1) * C/Bi$$

where, A is the start time of the bandwidth update period.

The arrival times at the subscriber line terminal (SLT) unit 8 of cells from a terminal unit (ONU) 4 assuming that the cells of the connection VCi arrive at not more than the sustainable cell rate (Si) at all times are the ideal arrival times Ti. The time interval of the ideal arrival times Ti is $$C/Si \text{ (slots)}$$

When allocating N'i number of cells in the bandwidth update period Tupdate, the ideal arrival times Ti are newly advanced by exactly N'i*C/Si (slots). The ideal arrival time T-HEAD'i of the last cell becomes $$T.\text{HEAD}'i = T\text{-LAST}i + N'i * C/Si$$

The fluctuation value (BT') accompanying the last cell in one uplink frame can be calculated by the following equation:

$$BT' = T.\text{HEAD}'i - A.\text{HEAD}'i$$

The above will become clearer by reference to FIG. 5.

FIG. 5 is a timing chart illustrating the relationship between ideal arrival times and scheduled arrival times in a bandwidth update period. That is, it is a view of an example of the fluctuation.

A'i shown at the left in the figure shows the scheduled arrival times in the case of allocating the provisional bandwidth B'i. Similarly, Ti shows the ideal arrival times.

The numerical figures for the concrete example shown in FIG. 5 are as follows:

Bandwidth update period (Tupdate)=12 slots
B'i=40 Mbps
Si=30 Mbps
C=120 Mbps
Number (N) of allocated slots in bandwidth update period=Tupdate*B'i/C=12*40/120=4 slots
Start time A of bandwidth update period=0
Last scheduled arrival time: A.HEAD'i=A'i(k+3)=(N'i−1)*C/B'i=3*3=9
Last ideal arrival time: T.HEAD'i=Ti(k+3)=Ti(k−1)+N'i*C/Si=3+4*4=19
Fluctuation of last cell=T.HEAD'I−A.HEAD'i=19−9=10 slots In the above bandwidth calculation, it is predicted that if this amount of bandwidth is allocated to a certain connection, the last value of the fluctuation accumulated with each time slot becomes just this.

For example, in FIG. 5, assume that cells are allocated at intervals of three time slots in the bandwidth update period. The cells from a terminal unit (ONU) 4 arrive at the subscriber line terminal (SLT) unit 8 at the sequence of the lower row of the figure. The finally accumulated fluctuation is predicted to be of this extent.

Therefore, the allocated bandwidth is reduced (increased) under this prediction.

In the previously explained first embodiment of the present invention, the bandwidths Bi allocated to the connections VCi were determined so that the fluctuation value does not exceed the burst tolerance (BT).

If adding the second embodiment of the present invention explained above, since there is the restriction that an allocated bandwidth Bi may not exceed the peak cell rate parameter (Pi), the arrival interval of the cells becomes not more than C/Pi. Therefore, it is possible to ignore the fluctuation with respect to the peak cell rate (PCR) (CDVT) (third embodiment). Note that details of the steps for calculating the allocated bandwidth Bi are given in FIG. 8 to FIG. 11 explained later.

Figure 7:
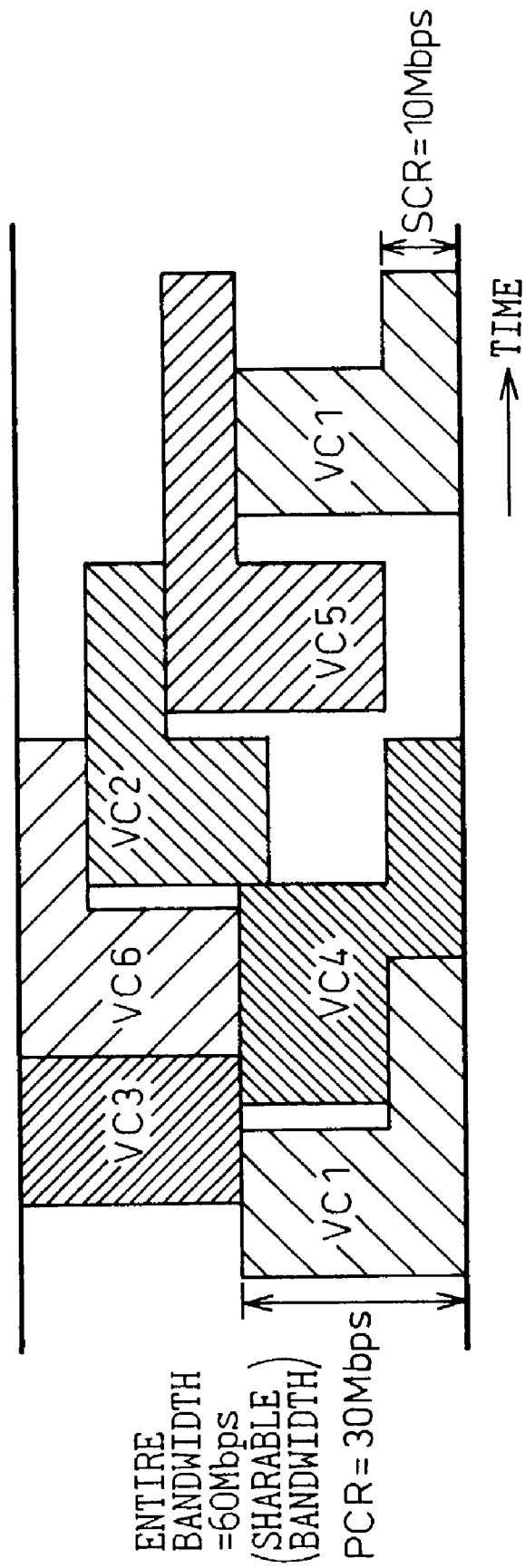
FIG. 7 is a view of an example of a model of bandwidth allocation according to a third embodiment.

Models of bandwidth allocation to connections VCi according to the first embodiment and third embodiment become for example as shown in FIG. 6 and FIG. 7.

FIG. 6 is a view of an example of a model of bandwidth allocation according to the first embodiment of the present invention, while FIG. 7 is a view of an example of a model of bandwidth allocation according to the third embodiment of the present invention.

FIG. 6 and FIG. 7 should be viewed in the same way as the above FIG. 23.

According to FIG. 6, since it is possible to dynamically change the allocated bandwidths, it is possible to effectively use unused bandwidth. Further, the subscriber line terminal (SLT) unit 8 can make the terminal units (ONU) 4 observe the traffic parameters (SCR/BT).

Further, according to FIG. 7, since the bandwidth allocations can be changed dynamically, it is possible to effectively use unused bandwidth. Further, the subscriber line terminal (SLT) unit 8 can make the terminal units (ONU) 4 observe the traffic parameters (PCR/CDVT/SCR/BT).

Next, a detailed example of the present invention will be explained.

Before starting the dynamic bandwidth allocation, the manager (subscriber line terminal (SLT) unit 8) sets the bandwidth update period (Tupdate), sharable bandwidth (SH), contracted parameter information of the connections VCi (PCR/SCR/BT), etc. in the parameter managing memory 43. The bandwidth calculating function unit 44 reads the parameter information necessary for bandwidth calculation from the parameter managing memory 43 at each bandwidth update period and determines the bandwidths Bi allocated to the connections VCi. The bandwidth update period Tupdate and the burst tolerance BTi are converted to times of time slot increments. Further, the ideal arrival times Ti and scheduled arrival times Ai show the times in time slot increments.

(i) First Embodiment of Present Invention

Figure 8:
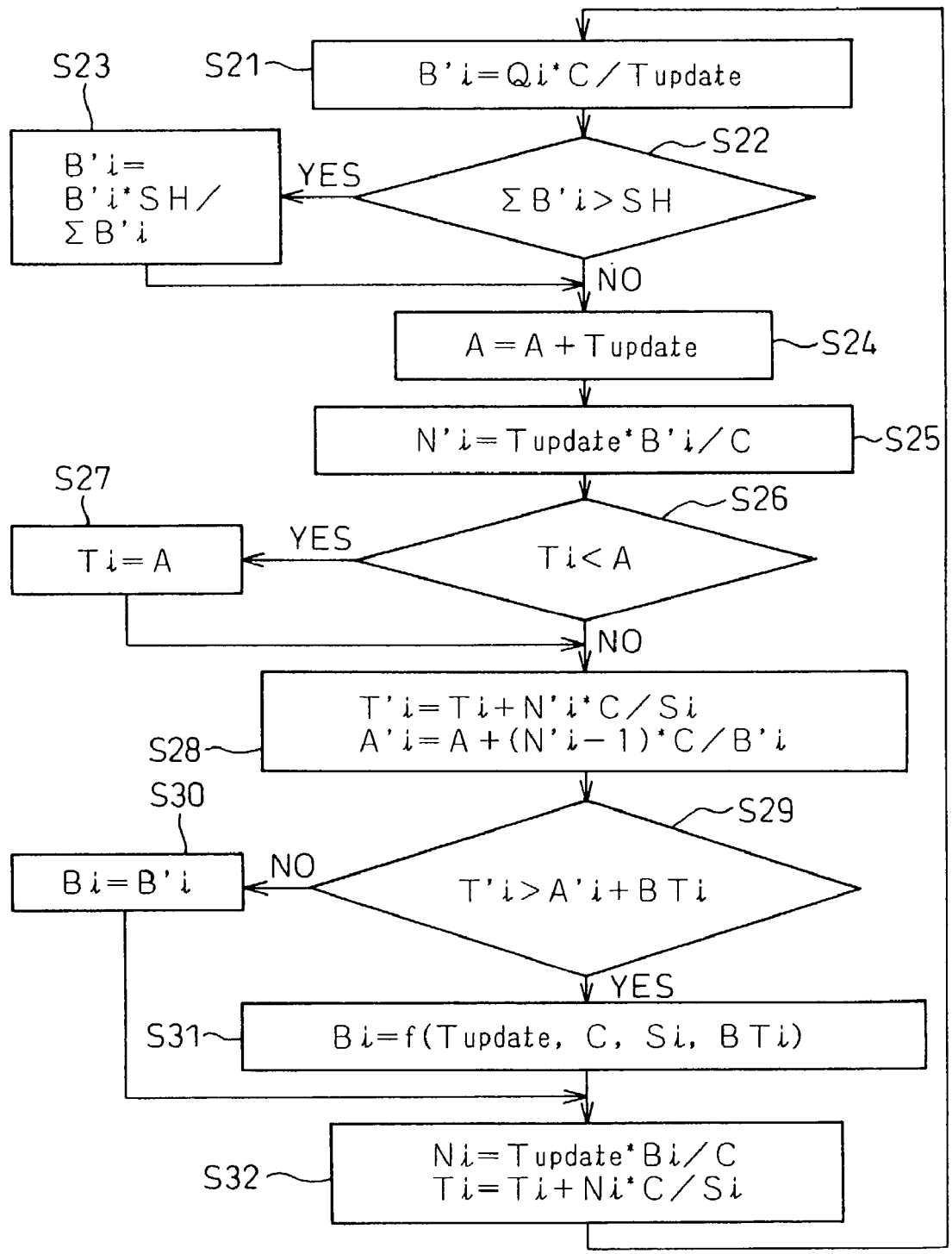
FIG. 8 is a flow chart of the operation in the first embodiment.

FIG. 8 is a flow chart of the operation in the first embodiment of the present invention.

This first embodiment is a system for observing the prescribed sustainable cell rate (SCR) and burst tolerance (BT) of the variable rate traffic in the dynamic bandwidth allocation system and performs the following processes (1) to (7):

(1) The subscriber line terminal (SLT) unit 8 converts the queue lengths Qi (cells) notified from the terminal units (ONU) 4 to provisional allocated bandwidths B'i (step S21 in FIG. 8).

$$B'i = Qi * C/T\text{update}$$

where, C is the transmission line capacity

When the total of the provisional allocated bandwidths B'i exceeds the sharable bandwidth SH, all of the provisional allocated bandwidths B'i are equally compressed (S22 and S23):

if $\Sigma B'i > SH$ $$B'i = B'i * SH/\Sigma B'i$$

(2) When the pre-update ideal arrival time (Ti before update) is less than the bandwidth update period start time (A), the pre-update ideal arrival time Ti is set to the bandwidth update period start time A (S26, S27).

(3) The number N'i of allocated time slots in the bandwidth update period when allocating the provisional allocated bandwidths B'i to the connections VCi is calculated (S25). The number N'i of allocated time slots calculated here is called the provisional number of allocated slots.

$$N'i = T\text{update} * B'i / C$$

(4) The provisional last scheduled arrival time A'i is then calculated. Here, A'i has the same meaning as the above A.HEAD'i.

The scheduled arrival time of the last time slot (provisional scheduled arrival time) A'i when allocating the provisional allocated bandwidths B'i to the connections VCi is calculated at step S28.

$$A'i = A + (N'i - 1) * C/B'i$$

where, C/B' is the allocated time slots, that is, the interval of the scheduled arrival times (5) The provisional ideal arrival time T'i is calculated. Here, T'i is the same in meaning as the above T.HEAD'i. When allocating bandwidths B'i to the connections VCi, N'i number of slots are allocated in the bandwidth update period. The ideal arrival time (provisional ideal arrival time) T'i of the last cell is calculated at the above step S28.

$$T'i = Ti + N'i * C/Si$$

where, C/Si is the interval of the ideal arrival times.

(6) The actual bandwidths Bi allocated to the connections VCi are determined.

When $$T'i \leq A'i + BT \quad (a)$$

(NO at S29), the burst tolerance (BT) parameter is not violated even if allocating the provisional allocated bandwidths B'i to the connections VCi as they are. Therefore, the provisional allocated bandwidths B'i are set for the allocated bandwidths Bi (S30).

When $$T'i > A'i + BT \quad (b)$$

(YES at S29), the burst tolerance (BT) parameter would be violated if the provisional allocated bandwidths B'i were allocated to the connections VCi as they were.

To solve this problem, the above computing means 32 (FIG. 1) finds the solution to a predetermined quadratic equation having the values Bi of the allocated bandwidths as variables and uses the solution as the allocated bandwidths Bi sought. Explaining this in more detail, the bandwidth calculating function unit 44 in the computing means 32 solves the later shown quadratic equation to re-calculate the allocated bandwidths Bi. At this time, the larger of the two solutions is preferably selected. This is based on results of experiments.

First, giving several related conditional equations:

$$Ti + N'i * C/Si = A + (N'i - 1) * C/Bi + BTi \text{ and}$$

$$N'i = T\text{update} * B'i / C,$$

so the following is obtained:

$$Ti + T_{update} \cdot B'i/Si = A + (T_{update} \cdot B'i/C - 1) \cdot C/B'i + BTi$$

If B'i and Si are multiplied with at the two sides of the equation to clean it up and the following quadratic equation is solved, the allocated bandwidths Bi to be sought are found (S31). "f" at step S31 expresses the quadratic function:

$$T_{update} \cdot Bi^2 + (Si \cdot Ti - A \cdot Si - T_{update} \cdot Si - Si \cdot BTi) \cdot Bi + C \cdot Si = 0$$

The solution to the above quadratic equation is $$Bi = \frac{A \cdot Si + T_{update} \cdot Si + Si \cdot BTi - Si \cdot Ti}{2 \cdot T_{update}} + \frac{\sqrt{(A \cdot Si + T_{update} \cdot Si + Si \cdot BTi - Si \cdot Ti)^2 - 4 \cdot T_{update} \cdot C \cdot Si}}{2 \cdot T_{update}}$$

(7) The ideal arrival times Ti are updated.

That is, the number Ni of allocated time slots is calculated and the ideal arrival times Ti are re-calculated based on the allocated bandwidths Bi (S32).

$$Ni = T_{update} \cdot Bi/C, \text{ so}$$

$$Ti = Ti + Ni \cdot C/Si = Ti + T_{update} \cdot Bi/Si$$

(ii) Third Embodiment of Present Invention

Figure 9:
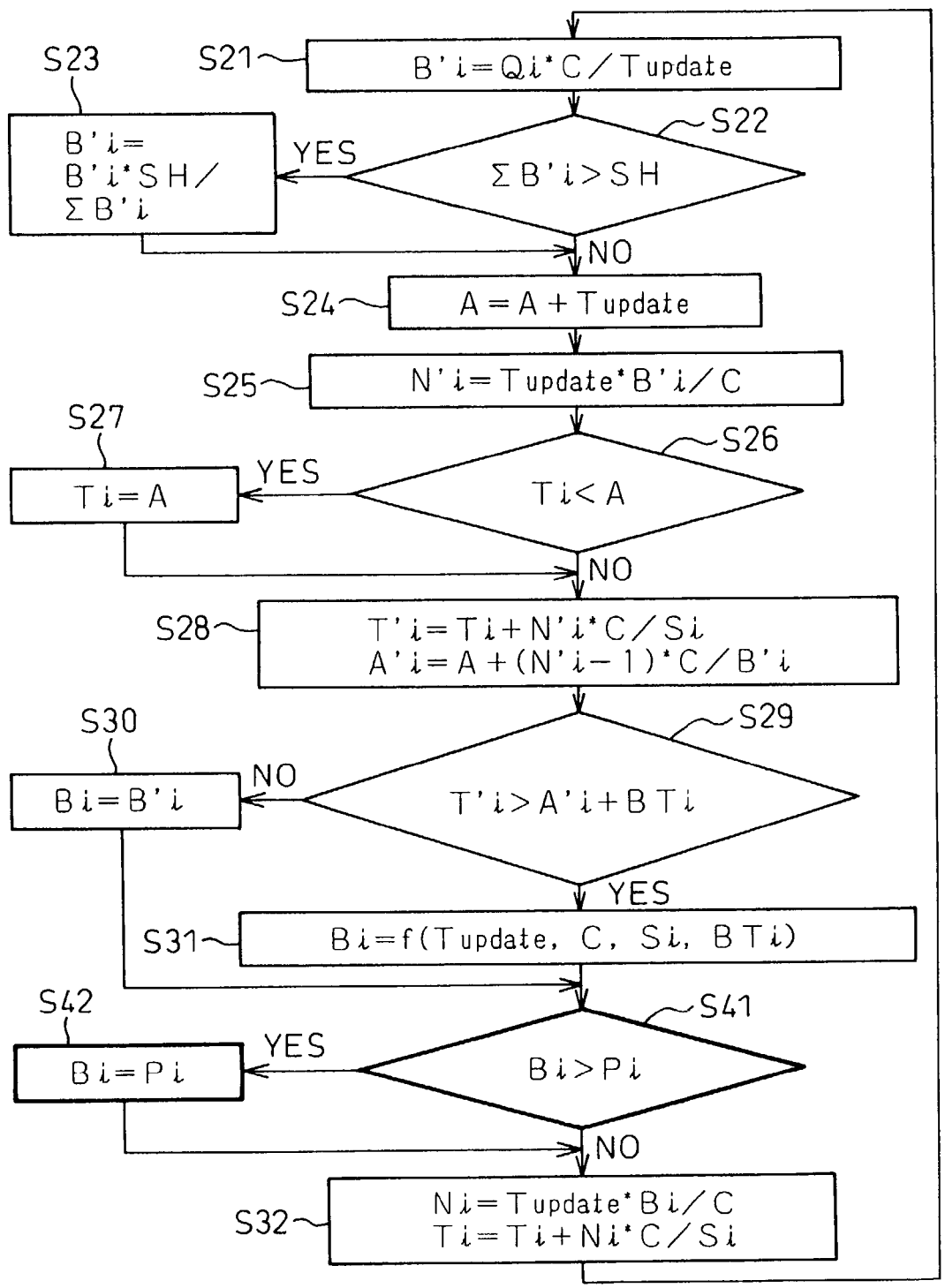
FIG. 9 is a flow chart of the operation in the third embodiment.

FIG. 9 is a flow chart of the operation in the third embodiment of the present invention.

This third embodiment is an equation for further ensuring the observation of the parameter of the peak cell rate (PCR) as compared with the first embodiment. The difference from the first embodiment is that the allocated bandwidths Bi are limited to the peak cell rate (PCR) contract values (Pi) of the connections VCi. This being the case, the arrival intervals of the cells become not more than C/Pi (slots), so no fluctuation (CDVT) with respect the peak cell rate (PCR) occurs any longer.

The processes of the third embodiment are actually the same except as the above processes (1), (2), (3) . . . (7) except for the process (6). Therefore, steps S21 to S32 in FIG. 9 are exactly the same as steps S21 to S32 of FIG. 8. FIG. 9 differs from FIG. 8 in the point of addition of steps S41 and S42 in FIG. 9. These step S41 and S42 are related to the above process (6). When an allocated bandwidth Bi derived at the process (6) (solution of above quadratic equation) is over the peak cell rate Pi (YES at S41), the allocated bandwidth Bi is limited to the peak cell rate Pi (S42).

In the above first embodiment and third embodiment, the step S31 of solving the quadratic equation was included, so the processing load on the central processing unit (CPU) in the subscriber line terminal (SLT) unit 8 and the specialized hardware became heavier. This is inconvenient when there is no surplus margin in the resources.

Therefore, a method will be proposed for eliminating this inconvenience. That is, under this method, when the allocated bandwidth Bi exceed a predetermined condition, the computing means 32 (FIG. 1) forcibly sets the allocated bandwidth to the sustainable cell rate (Si) or peak cell rate (Pi) according to the contracted parameters.

Figure 10:
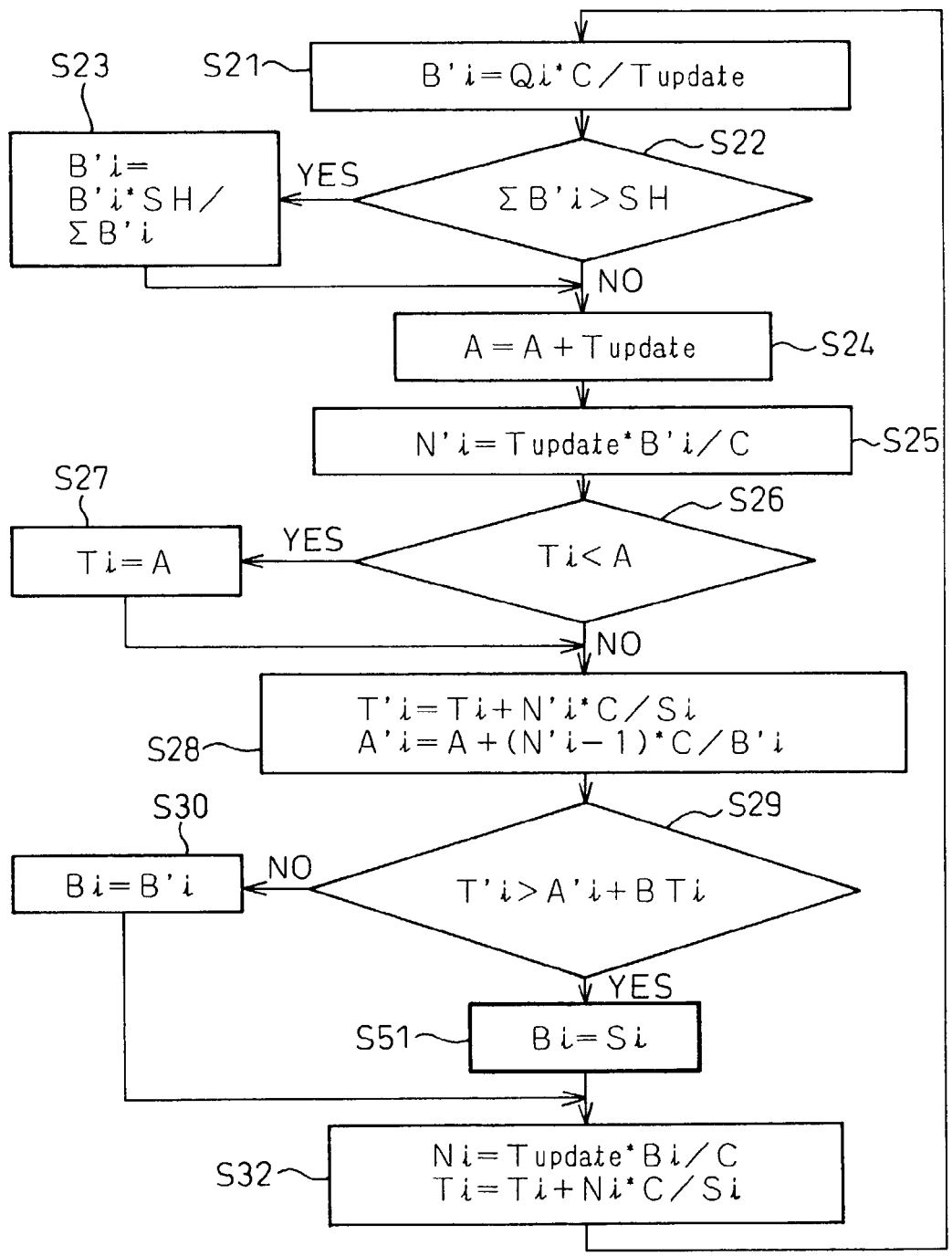
FIG. 10 is a flow chart of a modification of the operation in the first embodiment.
Figure 11:
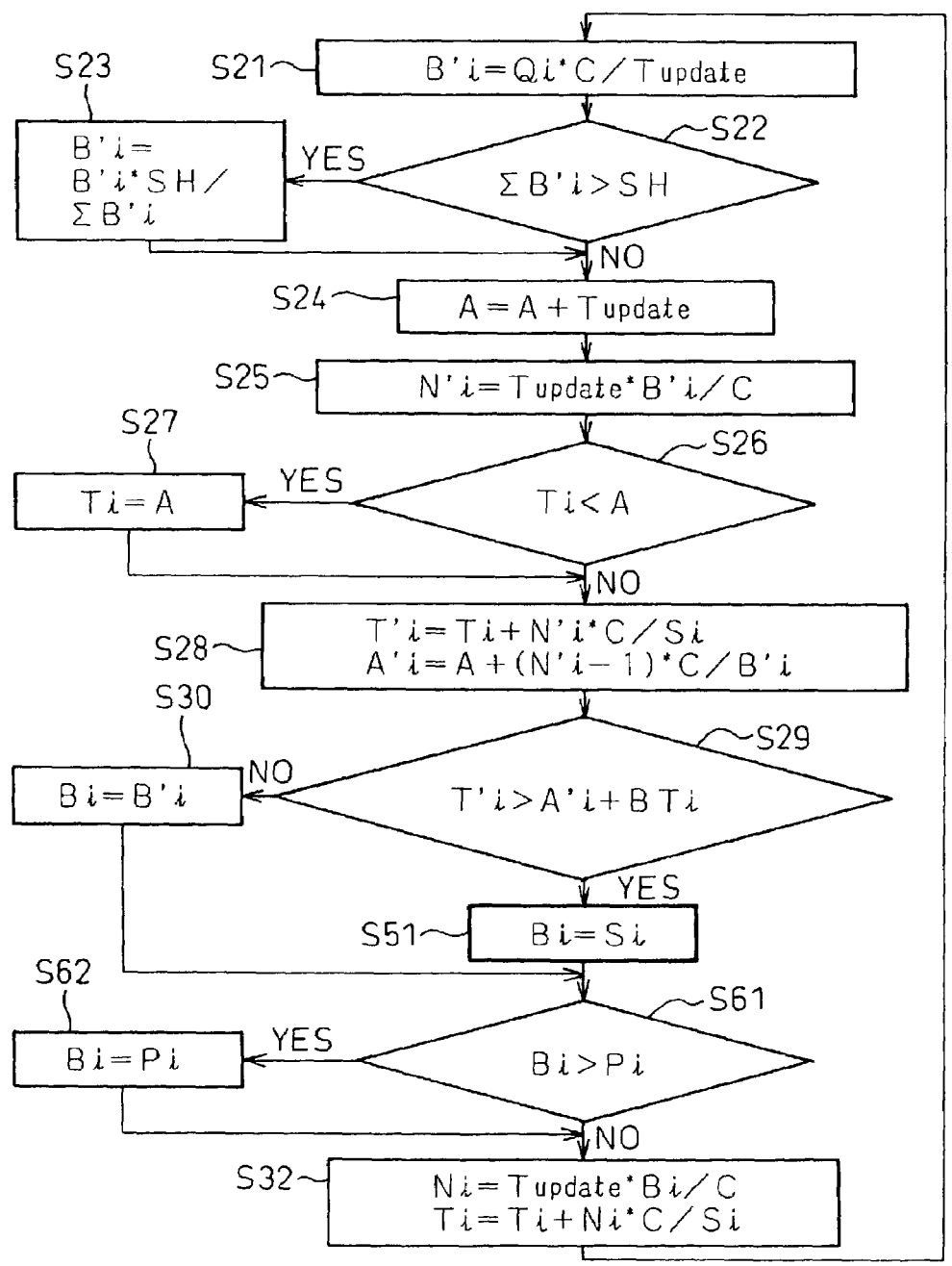
FIG. 11 is a flow chart of a modification of the operation in the third embodiment.

FIG. 10 is a flow chart of a modification of the operation in the first embodiment of the present invention, while FIG. 11 is a flow chart of a modification of the operation in the third embodiment of the present invention.

Looking first at FIG. 10, step S31 in the first embodiment of FIG. 8 is modified to step S51.

That is, when the burst tolerance BTi is exceeded under the first embodiment, instead of re-calculating the allocated bandwidth Bi, the contracted parameter (Si) relating to the sustainable cell rate (SCR) is set for the allocated bandwidth Bi. Step S51 of FIG. 10 corresponds to this. The modification of the first embodiment is somewhat inferior to the first embodiment in terms of the effective use of the bandwidth, but there is no problem in practice.

Next, looking at FIG. 11, step S31 in the first embodiment of FIG. 8 is replaced by step S51 of FIG. 10 and the new steps S61 and S62.

That is, when the burst tolerance BTi is exceeded under the first embodiment, instead of re-calculating the allocated bandwidth Bi, the contracted parameter (Si) relating to the sustainable cell rate (SCR) is set for the allocated bandwidth Bi (S51). When the contracted parameter (Pi) relating to the peak cell rate (PCR) is exceeded (YES at S61), the contracted parameter (Pi) is set for the allocated bandwidth Bi (S62). The modification of the third embodiment is somewhat inferior to the third embodiment in terms of the effective use of the bandwidth, but there is no problem in practice.

Summarizing the effects of the invention, it is possible to improve the transfer efficiency of variable rate traffic in an ATM-PON system by changing the bandwidth Bi in accordance with the arrival of data.

Further, since the traffic is shaped so as to satisfy the parameters of the sustainable cell rate (SCR) and burst tolerance (BT), the network can predict to a certain extent the properties of the connections handled and therefore when predicting that the network will become overloaded, can refuse to accept new connections.

As a result, it is possible to guarantee the sustainable cell rate (SCR) for the connections VCi handled and possible to eliminate deterioration in performance due to buffer overflow etc. occurring due to the inflow of more than the contracted traffic into the network (first embodiment).

In addition, it is possible to define the parameters of the peak cell rate (PCR) or cell delay variance tolerance (CDVT) as well, so it becomes possible to shape the traffic more strictly (third embodiment).

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2002-24424, filed on Jan. 31, 2002, the disclosure of which is expressly incorporated herein by reference in its entirety.

What is claimed is:

1. A network side transmission apparatus designating timings of transfer of information for a plurality of terminal units on a user side, receiving information transferred from said plurality of terminal units by time division multiplexing at the transfer timings, and controlling variable rate traffic by dynamic bandwidth allocation, comprising:
   an allocating unit assigning allocated bandwidths for transfer corresponding to connections periodically according to amounts of information to be transferred corresponding to the connections stored in the terminal units; and
   a computing unit computing the allocated bandwidths so that contracted parameters relating to a sustainable cell rate and a peak cell rate and contracted parameters relating to fluctuation values allowed for the sustainable cell rate and peak cell rate preset for the connections are observed, the computing unit forcibly setting the allocated bandwidth to the sustainable cell rate or peak cell rate according to the contracted parameters when the allocated bandwidth exceeds a predetermined condition.

2. A network side transmission apparatus as set forth in claim 1, wherein said computing unit finds the solution to a predetermined quadratic equation having the value of an allocated bandwidth as a variable and uses the solution as the allocated bandwidth.

3. A network side transmission apparatus designating timings of transfer of information for a plurality of terminal units on a user side, receiving information transferred from said plurality of terminal units by time division multiplexing at the transfer timings, and controlling variable rate traffic by dynamic bandwidth allocation, comprising:
- a queue length extracting function unit receiving notifications relating to the queue lengths of information stored for connections in buffers of the terminal units from the terminal units and extracting the queue lengths;
- a parameter setting function unit setting at least one of a contracted parameter relating to a sustainable cell rate, a contracted parameter relating to a peak cell rate, and contracted parameters relating to fluctuation values allowed for the sustainable cell rate and peak cell rate for the connections contracted for with the terminal units;
- a parameter managing memory storing at least the queue length information and contracted parameter information input from the queue length extracting function unit and the parameter setting function unit; and
- a bandwidth calculating function unit periodically calculating the allocated bandwidths for the connections so that the contracted parameters are observed and re-storing the results of the calculation in the parameter managing memory.

4. A network side transmission apparatus as set forth in claim 3, further comprising a polling information generating function unit determining the timings of transfer of information to be designated for the terminal units in accordance with the allocated bandwidths of the results of calculation re-stored in the parameter managing memory and transferring them as polling information to the terminal units.

5. A method of control of variable rate traffic by dynamic bandwidth allocation in a network side transmission apparatus which designates the timings of transfer of information for a plurality of terminal units on a user side and receives information transferred from these terminal units by time division multiplexing at the designated transfer timings, comprising the steps of:
- receiving notifications relating to queue lengths of information stored for connections in buffers of the terminal units from the terminal units and extracting the queue lengths;
- setting at least one of a contracted parameter relating to a sustainable cell rate, a contracted parameter relating to a peak cell rate, and contracted parameters relating to fluctuation values allowed for the sustainable cell rate and peak cell rate for connections contracted for with the terminal units;
- storing at least the queue length information and contracted parameter information provided at the receiving and setting steps; and
- periodically calculating the allocated bandwidths for connections so that the contracted parameters are observed and re-storing the results of the calculation at the storing step.

6. A communication system comprised of:
- a plurality of terminal units at a user side for reading and transferring information by time division multiplexing from each of internal buffers provided for each of connections at designated timing of transfer of information;
- a network side control apparatus designating said timing of transfer of information for each of said terminal units, receiving information read and transferred from each said buffer in each said terminal unit, and controlling variable rate traffic by dynamic bandwidth allocation; and
- a time division multiplexing transmission line transferring polling information designating said transfer timing to each of said plurality of terminal units and transferring information from each said buffer to said network side transmission apparatus at the designated transfer timings;

said network side transmission apparatus comprising:
- a queue length extracting function unit receiving notifications relating to the queue lengths of information stored for connections in buffers of the terminal units from the terminal units and extracting the queue lengths;
- a parameter setting function unit setting at least one of a contracted parameter relating to a sustainable cell rate, a contracted parameter relating to a peak cell rate, and contracted parameters relating to fluctuation values allowed for the sustainable cell rate and peak cell rate for the connections contracted for with the terminal units;
- a parameter managing memory storing at least the queue length information and contracted parameter information input from the queue length extracting function unit and the parameter setting function unit; and
- a bandwidth calculating function unit periodically calculating the allocated bandwidths for the connections so that the contracted parameters are observed and re-storing the results of the calculation in the parameter managing memory.

7. A method of control of variable rate traffic by dynamic bandwidth allocation in a network side transmission apparatus which designates the timings of transfer of information for a plurality of terminal units on a user side and receives information transferred from these terminal units by time division multiplexing at the designated transfer timings, comprising the steps of:
- receiving notifications relating to queue lengths of information stored for connections in buffers of the terminal units from the terminal units and extracting the queue lengths;
- setting at least one of a contracted parameter relating to a sustainable cell rate, a contracted parameter relating to a peak cell rate, and contracted parameters relating to fluctuation values allowed for the sustainable cell rate and peak cell rate for connections contracted for with the terminal units;
- storing at least the queue length information and contracted parameter information provided at the receiving and setting steps;
- periodically calculating the allocated bandwidths for connections so that the contracted parameters are observed and re-storing the results of the calculation at the storing step;
- determining the timings of transfer of information to be designated for the terminal units in accordance with the allocated bandwidths of the results of calculation re-stored in the parameter managing memory; and
- transferring them as polling information to the terminal units.

* * * * *